US011168970B1

(12) United States Patent
Turley

(10) Patent No.: US 11,168,970 B1
(45) Date of Patent: *Nov. 9, 2021

(54) ADJUSTABLE SQUARE

(71) Applicant: Woodpeckers, LLC, Strongsville, OH (US)

(72) Inventor: Paul E. Turley, Amherst, OH (US)

(73) Assignee: Woodpeckers, LLC, Strongsville, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/307,370

(22) Filed: May 4, 2021

Related U.S. Application Data

(63) Continuation of application No. 17/112,422, filed on Dec. 4, 2020, which is a continuation-in-part of application No. 16/849,720, filed on Apr. 15, 2020.

(51) Int. Cl.
*G01B 3/56* (2006.01)
*G01B 3/00* (2006.01)
*G01B 3/04* (2006.01)

(52) U.S. Cl.
CPC ............ *G01B 3/566* (2013.01); *G01B 3/006* (2013.01); *G01B 3/04* (2013.01)

(58) Field of Classification Search
CPC .......... G01B 3/566; G01B 3/006; G01B 3/04; G01B 3/08
USPC ............................ 33/427, 464, 480, 42, 494
See application file for complete search history.

(56) References Cited

U.S. PATENT DOCUMENTS

| | | | | |
|---|---|---|---|---|
| 828,375 A | * | 8/1906 | Breul ....................... | B25H 7/04 33/42 |
| 854,351 A | * | 5/1907 | Hight ....................... | B25H 7/04 33/42 |
| 888,070 A | * | 5/1908 | Dissell ..................... | G01B 3/56 33/464 |
| 1,257,683 A | * | 2/1918 | Defenbaugh ............. | B43L 7/14 33/480 |
| 2,246,066 A | | 6/1941 | Frank | |
| 2,308,373 A | * | 1/1943 | Keegan .................... | G01B 3/56 33/419 |
| 2,404,911 A | * | 7/1946 | King ........................ | G01B 3/566 33/464 |
| 2,448,440 A | | 8/1948 | King | |
| 2,588,131 A | * | 3/1952 | Lester .................... | G01B 5/065 33/838 |
| 3,335,498 A | | 8/1967 | Barbee | |

(Continued)

FOREIGN PATENT DOCUMENTS

GB 2426548 A * 11/2006 ............... G01B 3/08

*Primary Examiner* — Christopher W Fulton
(74) *Attorney, Agent, or Firm* — Sand, Sebolt & Wernow Co., LPA

(57) ABSTRACT

An adjustable square has a blade including a scale, a body, a slot formed in the body for movably receiving the blade, a locking mechanism operably engaged with the body for releasably securing the blade within the slot, and an indexing member operably engaged with the body and operably engaged with the blade. The indexing member indexes the body at precise locations along the blade. A method for indexing an adjustable square is also provided. The method includes positioning a body of the adjustable square at a precise known position and indexing, with an indexing member of the adjustable square, the body of the adjustable square at the precise known position.

21 Claims, 25 Drawing Sheets

(56) References Cited

U.S. PATENT DOCUMENTS

| | | | | |
|---|---|---|---|---|
| 3,364,581 | A * | 1/1968 | Andrews | G01B 3/1084 33/427 |
| 3,533,165 | A * | 10/1970 | Larsen | B43L 7/005 33/427 |
| D257,556 | S | 11/1980 | Fulton | |
| 4,503,624 | A * | 3/1985 | Whiteford | G01C 9/28 33/379 |
| 4,761,890 | A | 8/1988 | Morrell | |
| 5,062,213 | A | 11/1991 | Kolesky | |
| 5,339,530 | A | 8/1994 | Wright | |
| 6,393,715 | B1 * | 5/2002 | Ihle | G01B 3/08 33/613 |
| D460,008 | S | 7/2002 | Cina | |
| 6,785,976 | B1 | 9/2004 | Morehouse | |
| 6,931,735 | B1 | 8/2005 | Clark et al. | |
| 7,020,978 | B1 | 4/2006 | Nelson | |
| D546,213 | S | 7/2007 | Daley | |
| 7,254,898 | B1 * | 8/2007 | Armstrong | B43L 7/007 33/419 |
| D625,624 | S | 10/2010 | Juhl | |
| D679,968 | S | 4/2013 | Chiu | |
| D682,056 | S | 5/2013 | Beilin | |
| 9,644,934 | B2 | 5/2017 | Hershkovich | |
| D814,322 | S | 4/2018 | Pepper | |
| 10,239,200 | B2 * | 3/2019 | Pepper | G01B 3/563 |
| D848,872 | S | 5/2019 | Hummel | |
| D853,256 | S | 7/2019 | Lee | |
| D866,363 | S | 11/2019 | Mackey | |
| 10,532,603 | B2 | 1/2020 | Hummel | |
| D883,821 | S | 5/2020 | Herniman | |
| D887,875 | S | 6/2020 | Mackey | |
| 2006/0283032 | A1 | 12/2006 | Tank | |
| 2007/0056175 | A1 | 3/2007 | Lee et al. | |
| 2007/0204475 | A1 | 9/2007 | Marcus | |
| 2014/0290080 | A1 | 10/2014 | Buzzell et al. | |
| 2014/0373373 | A1 | 12/2014 | Hershkovich | |
| 2017/0341219 | A1 | 11/2017 | Pepper | |
| 2019/0225009 | A1 | 7/2019 | Hummel | |
| 2021/0072012 | A1 | 3/2021 | Anderson | |

\* cited by examiner

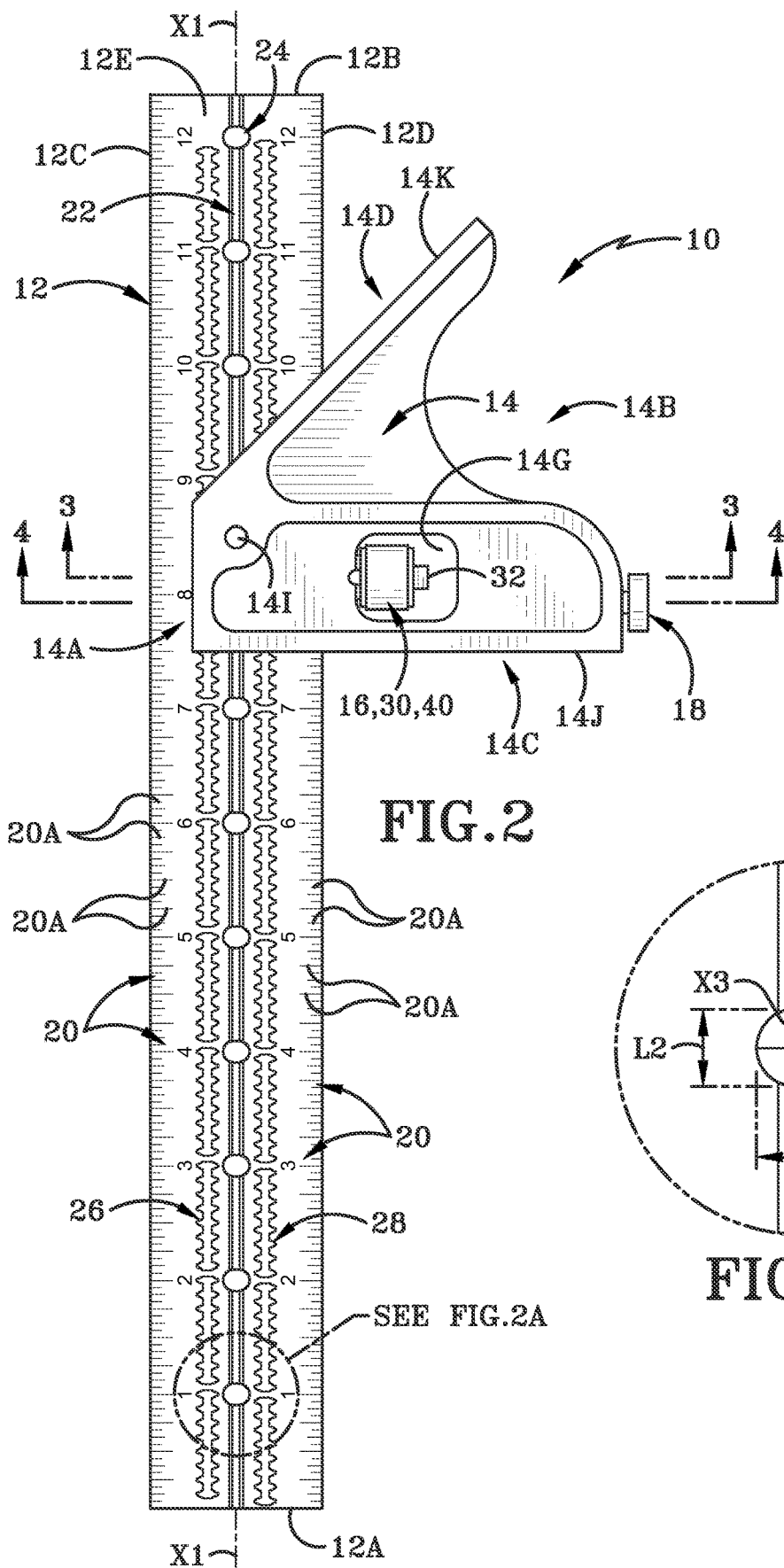

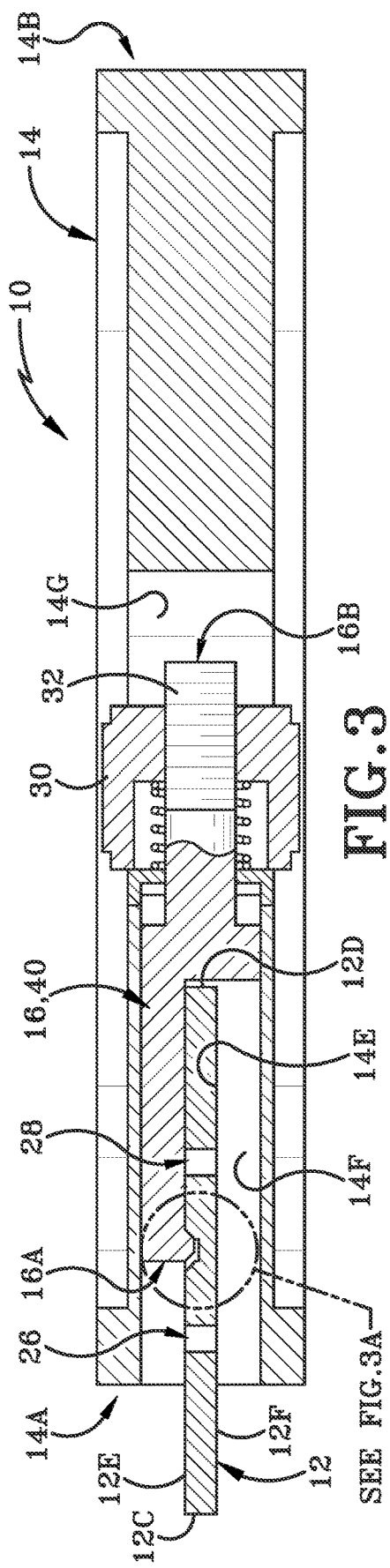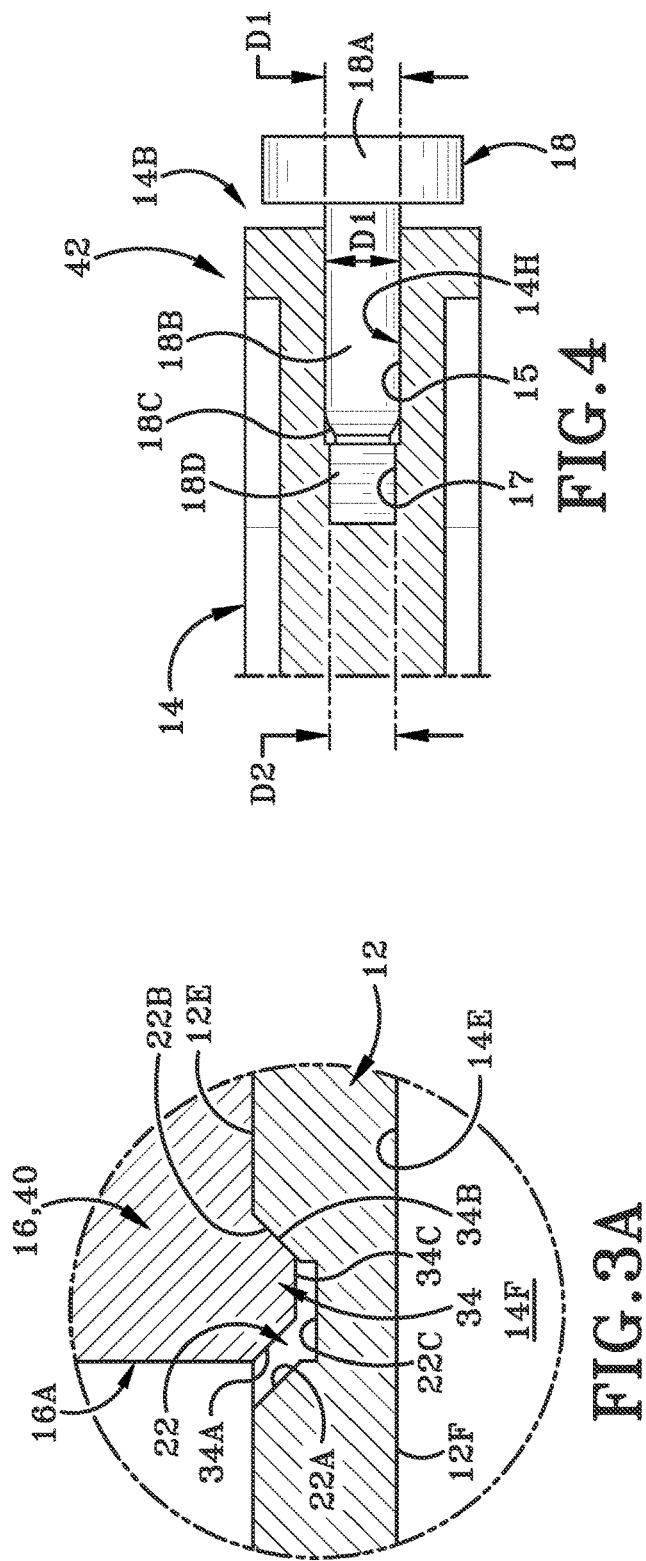

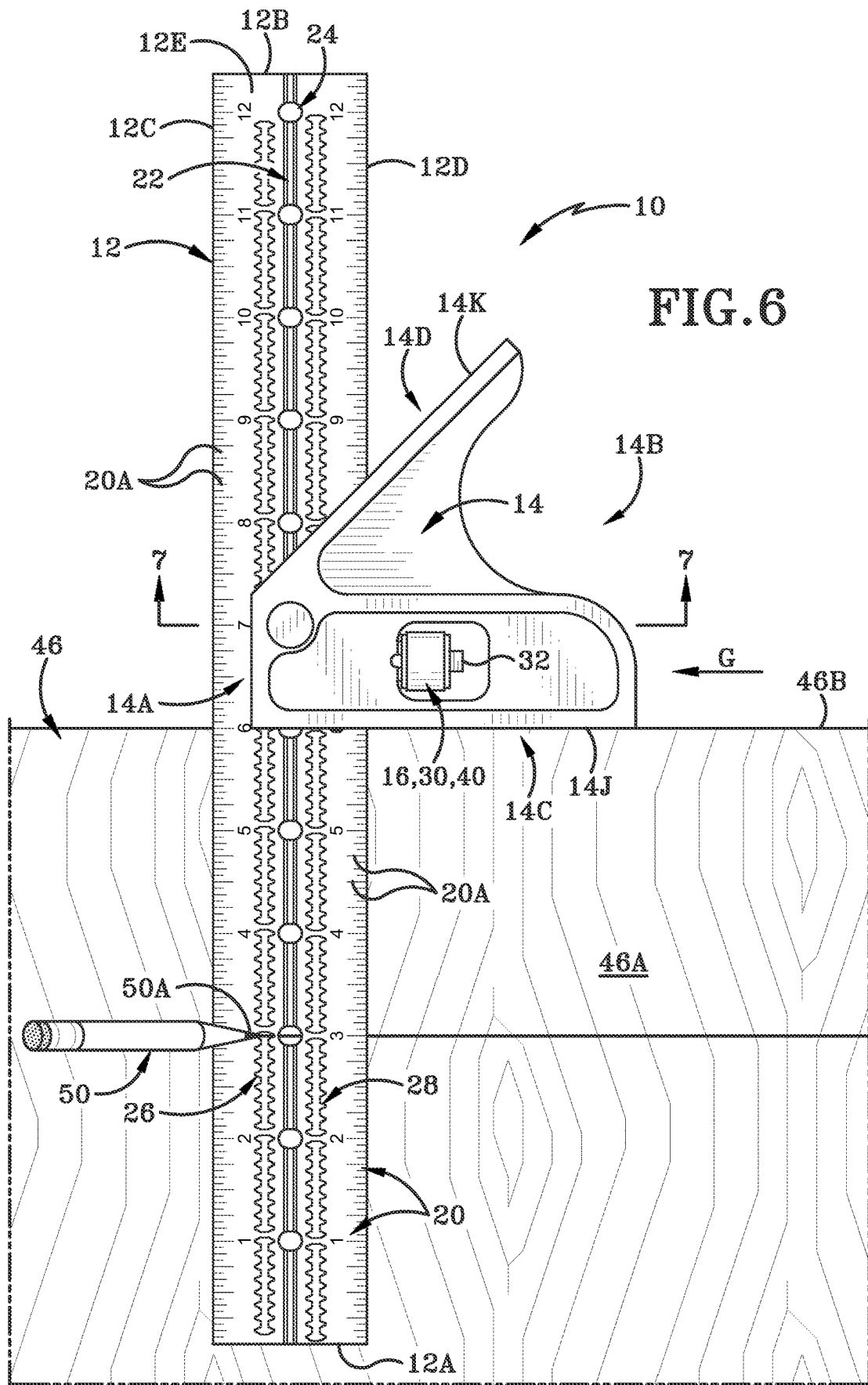

ADJUSTABLE SQUARE

CROSS REFERENCE TO RELATED APPLICATIONS

This application claims the benefit of and is a Continuation application of U.S. patent application Ser. No. 17/112,422 filed on Dec. 4, 2020, which is a Continuation-in-Part application of U.S. patent application Ser. No. 16/849,720 filed on Apr. 15, 2020; the disclosures of which are incorporated herein by reference.

TECHNICAL FIELD

The present disclosure relates generally to a multipurpose tool. More particularly, the present disclosure relates to an adjustable square. Specifically, the present disclosure relates to an adjustable square including a body and an indexing member for indexing body of the adjustable square at precise known locations.

BACKGROUND

Background Information

An adjustable square is a multipurpose tool utilized in woodworking, metalworking, and other industries. Some typical uses of the adjustable square, among others, include measuring angles, scribing lines, serving as a depth gauge, and ensuring machinery is at a proper angle. For example, the adjustable square is typically used to measure ninety degree angles and/or forty-five degree angles, scribe perpendicular and parallel lines, determine depth measurements of workpieces and/or cutting mechanisms, and determining whether to make adjustments to machinery.

The adjustable square comes in various sizes and configurations, however, each size and configuration typically includes a blade, a body, and an engaging mechanism. The blade usually has a scale printed, embossed, or etched therein, and the body is typically movable along a length of the blade. The body is fixed at particular positions along the scale of the blade via the engaging mechanism. However, one drawback associated with having a movable body is that it is sometimes difficult to quickly and precisely position the body at various points along the blade.

SUMMARY

In one aspect, an exemplary embodiment of the present disclosure may provide an adjustable square comprising a blade including a scale, a body, a slot formed in the body for movably receiving the blade, a locking mechanism operably engaged with the body for releasably securing the blade within the slot, and an indexing member operably engaged with the body and operably engaged with the blade; wherein the indexing member indexes the body precisely at a known position along the scale of the blade. The adjustable square further includes a plurality of indexing apertures formed in the blade. The plurality of indexing apertures may be evenly spaced along a length of the blade and may be positioned along a longitudinal axis of the blade. The indexing member may pass through one of the plurality of indexing apertures and the indexing member may operably engage the blade.

The scale may include a plurality of graduations provided on the blade. Each of the plurality of indexing apertures may be aligned with one of the plurality of graduations and the indexing member may index the body relative to one of the plurality of graduations.

The adjustable square further includes a first series of notches and a second series of notches formed in the blade. The indexing member may index the body relative to the first series of notches and/or the second series of notches. The first series of notches and the second series of notches may be provided on opposite sides of the longitudinal axis of the blade. A portion of the indexing member may extend below the blade.

The adjustable square further includes an indexed bore formed in the body for releasably receiving the indexing member. The indexed bore may be aligned with one of the plurality of indexing apertures. Each of the plurality of indexing apertures may include a minor axis having a length and the indexing member may include a cylindrical section having a diameter. In one example, the length of the minor axis and the diameter of the cylindrical section are approximately a same distance. The adjustable square further includes a storage bore formed in the body for releasably receiving the indexing member. The indexing member may be configurable between a stored position and an indexed position. When the indexing member is releasably received within the storage bore, the indexing member is in the stored position. When the indexing member is releasably received within the indexed bore, the indexing member is in the indexed position.

The adjustable square further includes a first side surface of the body oriented at a ninety degree angle relative to the blade. In one example, the adjustable square further includes a second side surface of the body oriented at a forty-five degree angle relative to the blade. In another example, the adjustable square further includes a second side surface of the body oriented at a ninety degree angle relative to the blade.

In another aspect, an exemplary embodiment of the present disclosure may provide a method for indexing an adjustable square including positioning a body of the adjustable square at a precise known position along a scale of a blade of the adjustable square, and indexing, with an indexing member of the adjustable square, the body of the adjustable square at the precise known position.

The method further includes aligning one of a plurality of indexing apertures formed in the blade with an indexed bore formed in the body, inserting the indexing member into the indexed bore, passing the indexing member through the one of the plurality of indexing apertures, and operably engaging a portion of the blade with the indexing member to fix the body at the desired position. The method further includes indexing, with the indexing member, the body relative to a series of notches formed in the blade and aligned with graduations of the scale.

In another aspect, and exemplary embodiment of the present disclosure may provide an adjustable square having a blade including a scale, a body, a slot formed in the body for movably receiving the blade, a locking mechanism operably engaged with the body for releasably securing the blade within the slot, and an indexing member operably engaged with the body and operably engaged with the blade. The indexing member indexes the body relative to the scale. A method for indexing an adjustable square is also provided. The method includes positioning the adjustable square at a desired position and indexing, with an indexing member of the adjustable square, a body of the adjustable square relative to a scale provided on a blade of the adjustable square.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2 is a top plan elevation view of the adjustable square of FIG. 1;

FIG. 2A is an enlarged fragmentary view of a portion of the adjustable square highlighted by the dashed box labeled SEE FIG. 2A of FIG. 2;

FIG. 3 is a cross-section view taken along line 3-3 of FIG. 2;

FIG. 3A is an enlarged fragmentary view of a portion of the adjustable square highlighted by the dashed box labeled SEE FIG. 3A of FIG. 3;

FIG. 4 is a cross-section view taken along line 4-4 of FIG. 2;

FIG. 6 is an operational view of the first embodiment of the adjustable square of FIG. 1 scribing a line on a workpiece;

Similar numbers refer to similar parts throughout the drawings.

DETAILED DESCRIPTION

Figure 1:
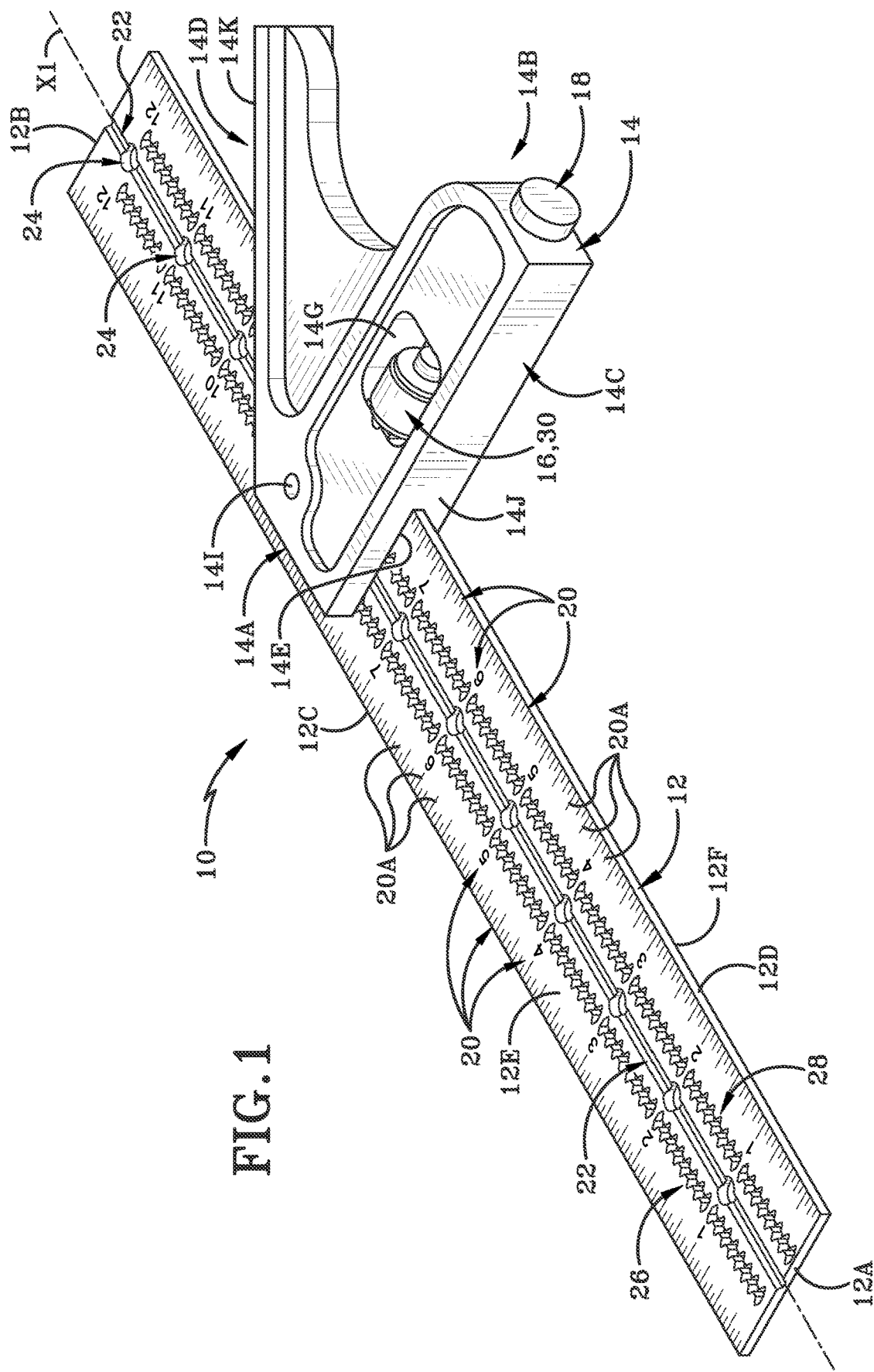
FIG. 1 is a front, top, right side isometric view of a first embodiment of an adjustable square.

Referring to FIG. 1-FIG. 7, there is shown a first embodiment of an adjustable square in accordance with one aspect of the present disclosure. The adjustable square, which may also be referred to as a combination square, is generally indicated at 10. The combination square 10 includes a blade 12, a body 14, which may also be referred to as a head, a locking mechanism 16, and an indexing member 18.

The indexing member 18 is utilized for indexing the body 14 precisely at known locations or positions along the blade 12. Since the body 14 is indexed precisely at known locations or positions along the blade 12, distances from the body 14 to points along the blade 12 are accurately known and can be used while utilizing the combination square 10. For example, the blade 12 may include measurement markings extending along a length of the blade 12, and the body 14 may be indexable at certain points along the blade 12 where the distance between the measurement markings and the indexable points are accurately known. If a user (not shown) of the combination square 10 desires to move the body 14 from one position to another position along the blade 12, the user can index the body 14 at the known location or position and the distance from the body 14 to the measurement markings is accurately known. This allows for greater precision when working with the combination square 10 of the present disclosure.

With continued reference to FIG. 1-FIG. 7, the blade 12 is an elongated rectangular-shaped metal plate and is configured to be operably engaged with the body 14 as more fully described below. The blade 12 includes a first end 12A, a second end 12B, a first side 12C, a second side 12D, a top 12E, and a bottom 12F. When the blade 12 is operably engaged with the body 14, the first end 12A and the second end 12B define a longitudinal direction therebetween, the first side 12C and the second side 12D define a transverse direction therebetween, and the top 12E and the bottom 12F define a vertical direction therebetween. The blade 12 further includes a central longitudinal axis X1 extending between the first end 12A and the second end 12B of the blade 12. Although the blade 12 has been described as being an elongated rectangular-shaped metal plate, it is to be understood that the blade 12 may be any suitable shape and be made of any suitable material.

The blade 12 includes a scale 20, a groove 22 formed in a portion of the blade 12, a plurality of indexing apertures 24 formed in the blade 12, a first series of notches 26 formed in the blade 12, and a second series of notches 28 formed in the blade 12.

The scale 20 includes graduations 20A arranged longitudinally along the blade 12. The graduations 20A include twelve one-inch markings divided into one-sixteenth inch segments provided adjacent the first side 12C of the blade 12, and twelve one-inch markings divided into one-sixteenth inch segments provided adjacent the second side 12D of the blade 12. Although the graduations 20A have been described as utilizing U.S. customary units of measurement, the graduations 20A may utilize any suitable units of measurement. Further, although the scale 20 has been described as graduations 20A, it is to be understood that the scale 20 may utilize any suitable indicia.

The groove 22 extends longitudinally from the first end 12A of the blade 12 to the second end 12B of the blade 12. As shown in FIG. 3 and FIG. 3A, the groove 22 includes a first chamfered surface 22A, a second chamfered surface 22B, and a flat surface 22C, each of which extend longitudinally from the first end 12A of the blade 12 to the second end 12B of the blade 12. The first chamfered surface 22A is provided between the first side 12C of the blade 12 and the central longitudinal axis X1 of the blade 12. The second chamfered surface 22B is provided between the second side 12D of the blade 12 and the central longitudinal axis X1 of the blade 12. The flat surface 22C is provided generally along the central longitudinal axis X1 of the blade 12 and between the first chamfered surface 22A and the second chamfered surface 22B.

With primary reference to FIG. 2 and FIG. 2A, the plurality of indexing apertures 24 will now be described. Each of the plurality of indexing members 24 are substantially similar in construction and, as such, only one of the plurality of indexing apertures 24 will be described herein and will be designated as 24A. For example, the indexing aperture 24A is substantially elliptical in shape and includes a major axis X2 having a length L1 and a minor axis X3 having a length L2. A distance of length L1 is greater than a distance of length L2. The indexing aperture 24A is provided at the one inch marking and extends between the top 12E and bottom 12F of the blade 12 and through the first chamfered surface 22A, second chamfered surface 22B, and the flat surface 22C of the groove 22. More particularly, the major axis X2 of the indexing aperture 24A aligns transversely with the first one inch marking, and the minor axis X3 aligns with the central longitudinal axis X1. The plurality of indexing apertures 24 are provided longitudinally along the blade 12 such that one of the plurality of indexing apertures 24 is provided at each one inch marking along the blade 12. Stated otherwise, the plurality of indexing apertures 24 is evenly spaced along a length of the blade 12. Although the plurality of indexing apertures 24 has been described as being elliptical in shape, it is to be understood that the plurality of indexing apertures 24 may be any suitable shape. Further, although the plurality of indexing apertures 24 have been described as being positioned at each one inch marking along the blade 12, it is to be understood that the indexing apertures 24 may be placed in any suitable position.

With primary reference to FIG. 2, the first series of notches 26 formed in the blade 12 will now be described. The first series of notches 26 are substantially diamond-shaped cutouts formed between the top 12E of the blade 12 and the bottom 12F of the blade 12. The first series of notches 26 extend longitudinally along the blade 12 and are provided between the first side 12C of the blade 12 and the central longitudinal axis X1 of the blade 12. The first series of notches 26 are positioned such that one notch of the series of notches 26 is positioned at each eighth-inch marking.

With primary reference to FIG. 2, the second series of notches 28 formed in the blade 12 will now be described. The second series of notches 28 are substantially diamond-shaped cutouts formed between the top 12E of the blade 12 and the bottom 12F of the blade 12. The second series of notches 26 extend longitudinally along the blade 12 and are provided between the second side 12C of the blade 12 and the central longitudinal axis X1 of the blade 12. The second series of notches 26 are positioned such that one notch of the series of notches 26 is positioned at each odd-numbered one-sixteenth marking.

The first series of notches 26 and the second series of notches 28 are utilized for marking purposes as more fully described below. Although the first series of notches 26 and the second series of notches 28 have been described as being diamond-shaped cutouts, it is to be understood that the first series of notches 26 and the second series of notches 28 may be any suitable shape. Further, although the first series of notches 26 and the second series of notches 28 have been described as being positioned at each one-eighth inch marking and one-sixteenth inch marking, respectively, along the blade 12, it is to be understood that the first series of notches 26 and the second series of notches 28 may be placed in any suitable position.

With primary reference to FIG. 1-FIG. 4, and FIG. 7, the body 14 includes a front region 14A, a rear region 14B, a first side region 14C, and a second side region 14D. The body 14 further includes a slot 14E (FIG. 3), a channel 14F (FIG. 3), an aperture 14G (FIG. 3), a storage bore 14H (FIG. 4), an indexed bore 14I (FIG. 7), a first side surface 14J, and a second side surface 14K.

The slot 14E is formed in the body 14 proximate the front region 14A, the first side region 14C, and the second side region 14D of the body 14 and extends transversely from the front region 14A towards the rear region 14B of the body 14. The channel 14F is formed in the body 14 proximate a portion of the slot 14E and extends transversely from the front region 14A towards the rear region 14B. The aperture 14F is formed in the body 14 proximate the first side region 14C and extends through the body 14 in the vertical direction.

As shown in FIG. 4, the storage bore 14H includes an upper section 15 and a lower threaded section 17. The storage bore 14H is formed in the body 14 proximate the rear region 14B of the body 14 and extends transversely from the rear region 14B towards the front region 14A of the body 14. The upper section 15 has a diameter D1 and the lower threaded section 17 a diameter D2. As shown in FIG. 4, the diameter D1 is larger than the diameter D2.

Figure 7:
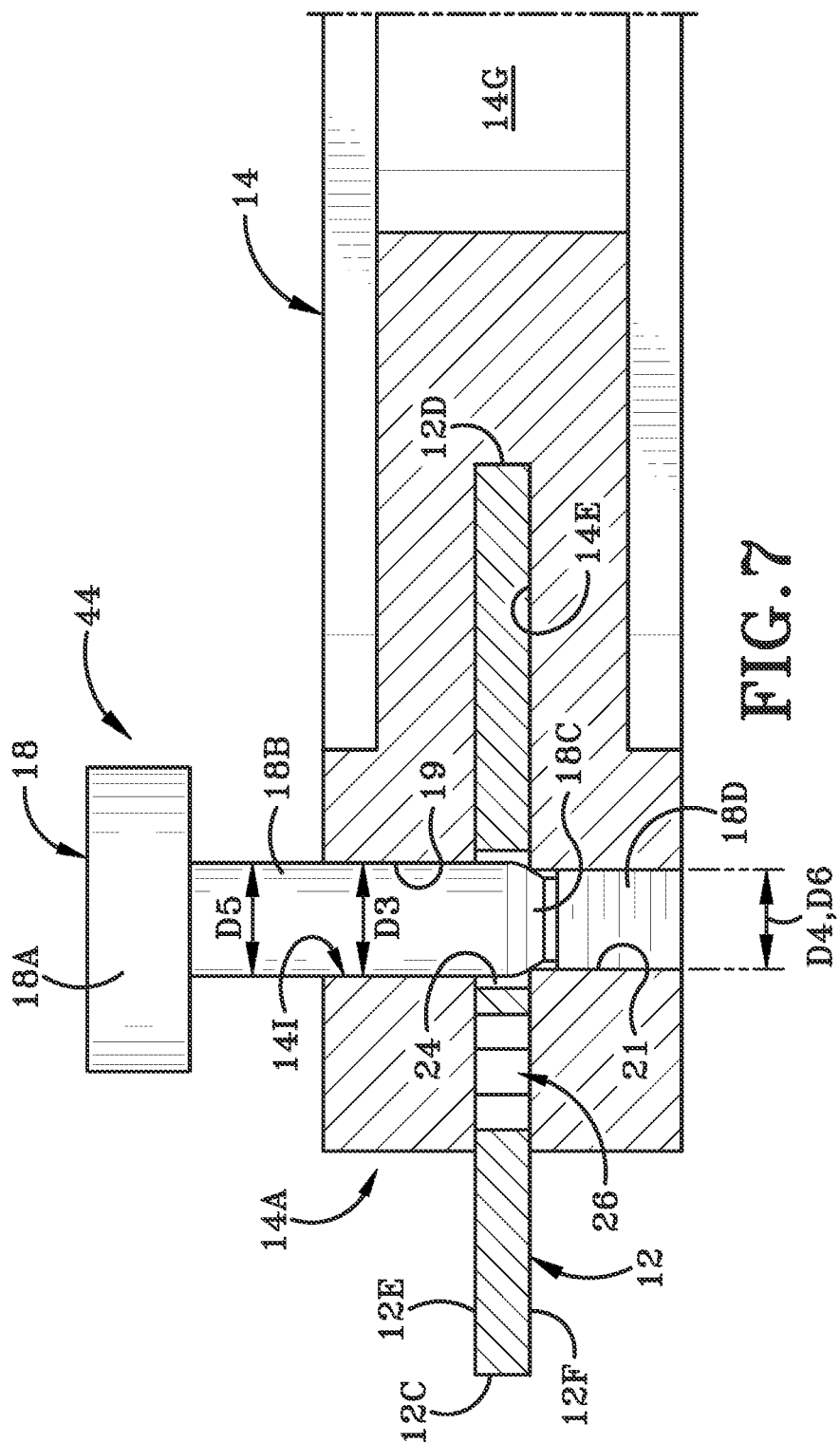
FIG. 7 is a cross-section view taken along line 7-7 of FIG. 6.

As shown in FIG. 7, the indexed bore 14I includes an upper section 19 and a lower threaded section 21. The indexed bore 14I is formed in the body 14 proximate the front region 14A of the body 14 and extends vertically within the body 14 between the channel 14F and the second side region 14D of the body 14. The upper section 19 has a diameter D3 and the lower threaded section 21 a diameter D4. As shown in FIG. 7, the diameter D3 is larger than the diameter D4.

The first side surface 14J extends transversely from the front region 14A towards the rear region 14B and is provided proximate the first side region 14C of the body 14. The second side surface 14K extends transversely from the front region 14A towards the rear region 14B and is provided proximate the second side region 14D of the body 14. When the blade 12 is operably engaged with the body 14, the first side surface 14J is oriented at an angle of ninety degrees relative to the central longitudinal axis X1 of the blade 12. When the blade 12 is operably engaged with the body 14, the second side surface 14K is oriented at an angle of forty-five degrees relative to the central longitudinal axis X1 of the blade 12.

With primary reference to FIG. 1, FIG. 3, and FIG. 3A, the locking mechanism 16 includes a front end 16A, a rear end 16B, an adjustment mechanism 30, and a threaded post 32. The adjustment mechanism 30 is operably engaged with the threaded post 32. The threaded post 32 includes a clamping member 34 proximate the front end 16A of the locking mechanism 16. The clamping member 34 includes a first beveled surface 34A, a second beveled surface 34B, and a flat surface 34C, each of which extend longitudinally between the first side region 14C and the second side region 14D of the body 14. The first beveled surface 34A, the second beveled surface 34B, and the flat surface 34C are complementary in shape to the first chamfered surface 22A, the second chamfered surface 22B, and the flat surface 22C of the groove 22 of the blade 12.

The locking mechanism 16 is configurable between an unlocked position 38 (FIG. 5B) and a locked position 40. The channel 14F is configured to receive the threaded post 32 and the clamping member 34 of the locking mechanism 16 such that the adjustment mechanism 30 is positioned within the aperture 14G, the threaded post 32 extends transversely through the channel 14F, and the clamping member 34 is positioned within the channel 14F proximate the slot 14E. The adjustment mechanism 30 is configured to move the threaded post 32 and the clamping member 34 in a transverse direction to move the locking mechanism 16 between the unlocked position 38 and the locked position 40 as more fully described below.

The blade 12 is configured to be releasably secured within the slot 14E via the locking mechanism 16. More particularly, the second beveled surface 34B of the clamping member 34 is configured to releasably contact the second chamfered surface 22B of the groove 22 of the blade 12. As such, when the locking mechanism 16 is in the unlocked position 38, the second beveled surface 34B of the clamping member 34 is not in contact with the second chamfered surface 22B of the groove 22 allowing the blade 12 to move through the slot 14E in the longitudinal direction. When the locking mechanism 16 is in the locked position 38, the second beveled surface 34B of the clamping member 34 is in contact with the second chamfered surface 22B of the groove 22 and the blade 12 is no longer movable within the slot 14E.

With primary reference to FIG. 4 and FIG. 7, the indexing member 18 is a metal pin and includes a gripping portion 18A, a cylindrical section 18B, a tapered section 18C, and a threaded end section 18D. The cylindrical section 18B has a diameter D5 that is approximately the same distance as length L2 of the minor axis X3 of the indexing aperture 24. The threaded end section 18D has a diameter D6 that is less than the diameter D5 of the cylindrical section 18B. The tapered section 18C has a diameter that tapers from the diameter D5 of the cylindrical section to the diameter D6 of the threaded end section 18D. The indexing member 18 is configurable between a stored position 42 (FIG. 4) and an indexed position 44 (FIG. 7). When the indexing member is in the stored position 42, the threaded end section 18D is threadingly engaged with the storage bore 14H. When the indexing member 18 is in the indexed position 44, the threaded end section 18D is threadingly engaged with the indexed bore 14I. The indexed bore 14I is provided at a distance of one inch from the first side surface 14J; however, the indexed bore 14I may be provided at any suitable distance. Although the indexing member 18 has been described as being a metal pin having a threaded shaft 36, it is to be understood that the indexing member 36 may be any suitable mechanism.

Having described the structure of the combination square 10 and its associated components, reference is now made to FIG. 5A through FIG. 7 to depict one exemplary use and operation of the combination square 10. As stated above, the indexing member 18 is configured to index the body 14 at particular positions along the blade 12, such as, for example, at every full inch along the length of the blade 12. This further allows the first series of notches 26 and the second series of notches 28 to be indexed to the body 14. In this example, the body 14 of the combination square 10 is shown being indexed at the seven inch marking of the graduations 20A.

Figure 5A:
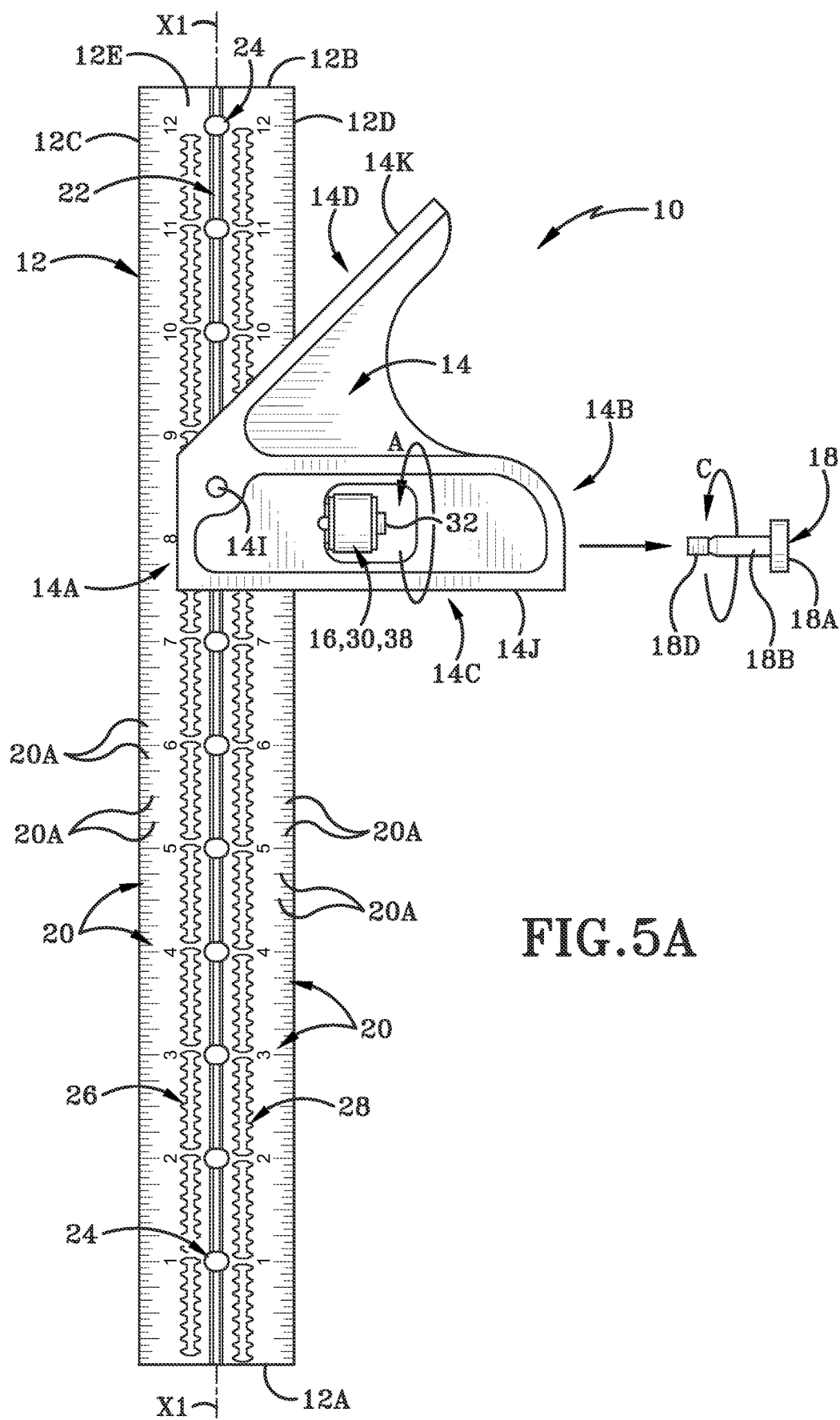
FIG. 5A is an operational view of the first embodiment of the adjustable square of FIG. 1.
Figure 5B:
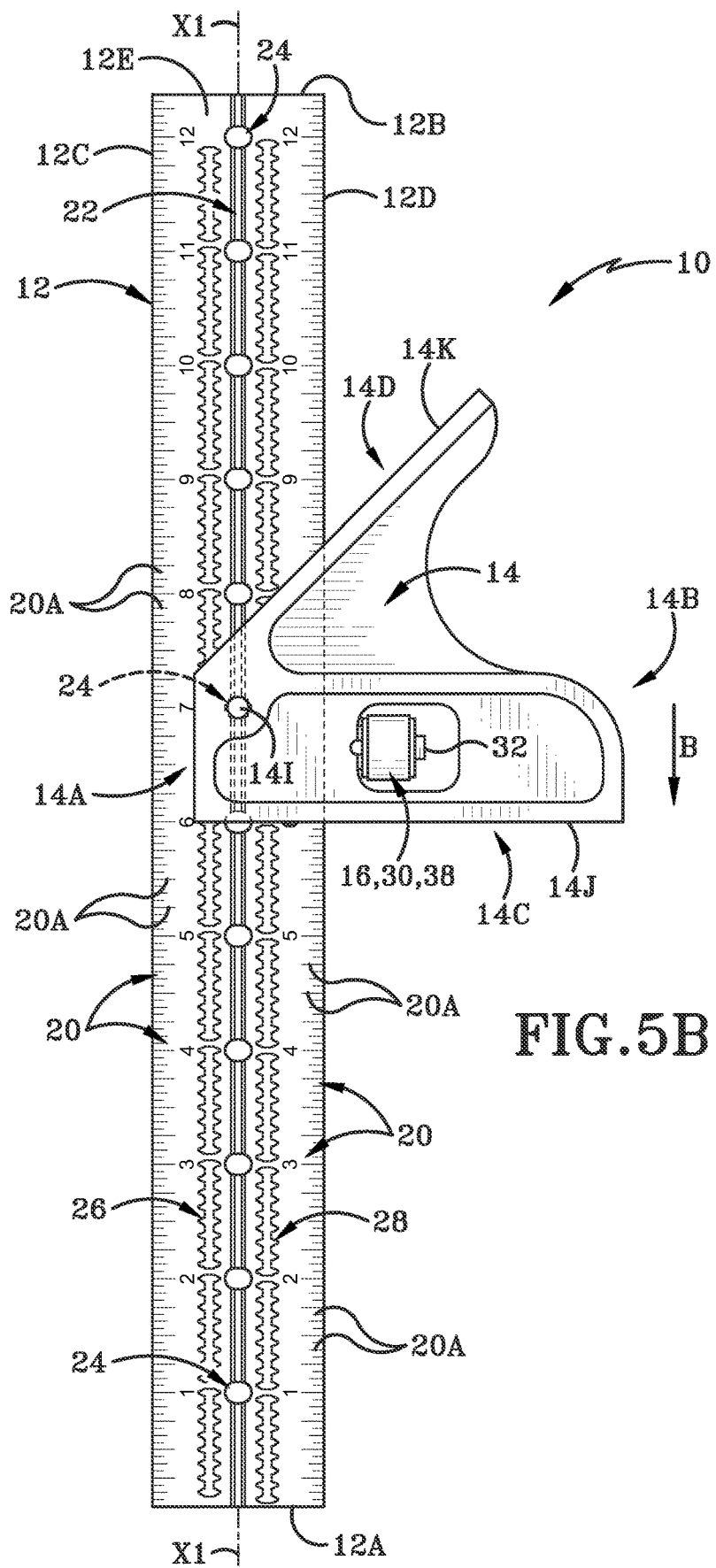
FIG. 5B is an operational view of the first embodiment of the adjustable square of FIG. 1.

With primary reference to FIG. 5A and FIG. 5B, the locking mechanism 16 is shown being moved from the locked position 40 to the unlocked position 38, the indexing member 18 is shown being removed from the stored position 42, and the body 14 is shown being moved such that the first side surface 14J moves from the seven and one half inch marking to the six inch marking and the indexed bore 14I is vertically aligned with one of the plurality of indexing apertures 24 of the blade 12 located at the seven inch marking.

To accomplish moving the locking mechanism from the locked position 40 to the unlocked position 38, a user (not shown) of the combination square 10 rotates the adjustment mechanism 30 of the locking mechanism 16 in a direction indicated by arrow A. This causes the threaded post 32 to move in a transverse direction toward the front region 14A of the body 14, which, in turn, causes the second beveled surface 34B of the clamping member 34 to move away from the second chamfered surface 22B of the groove 22 such that the second beveled surface 34B of the clamping member 34 is no longer in contact with the second chamfered surface 22B. This allows the body 14 to move in a longitudinal direction relative to the blade 12. For example, the body 14 is movable in a direction indicated by arrow B (FIG. 5B) relative to the blade 12. As stated above, and in this example, the body 14 is moved such that the first side surface 14J moves from the seven and one half inch marking to the six inch marking on the graduations 20A of the scale 20. Although the body 14 was described as moving in the direction indicated by arrow B, it is to be understood that the body 14 is also movable in the opposite direction to the direction indicated by arrow B.

To accomplish removing the indexing member 18 from the stored position 42, the user rotates the gripping portion 18A of the indexing member 18 in a direction indicated by arrow C (FIG. 5A). This rotates the indexing member 18 until the threaded end section 18D is no longer threadingly engaged with the storage bore 14H. The indexing member 18 is removed from the storage bore 14H and will be placed in the indexed position 44 as explained below.

Figure 5C:
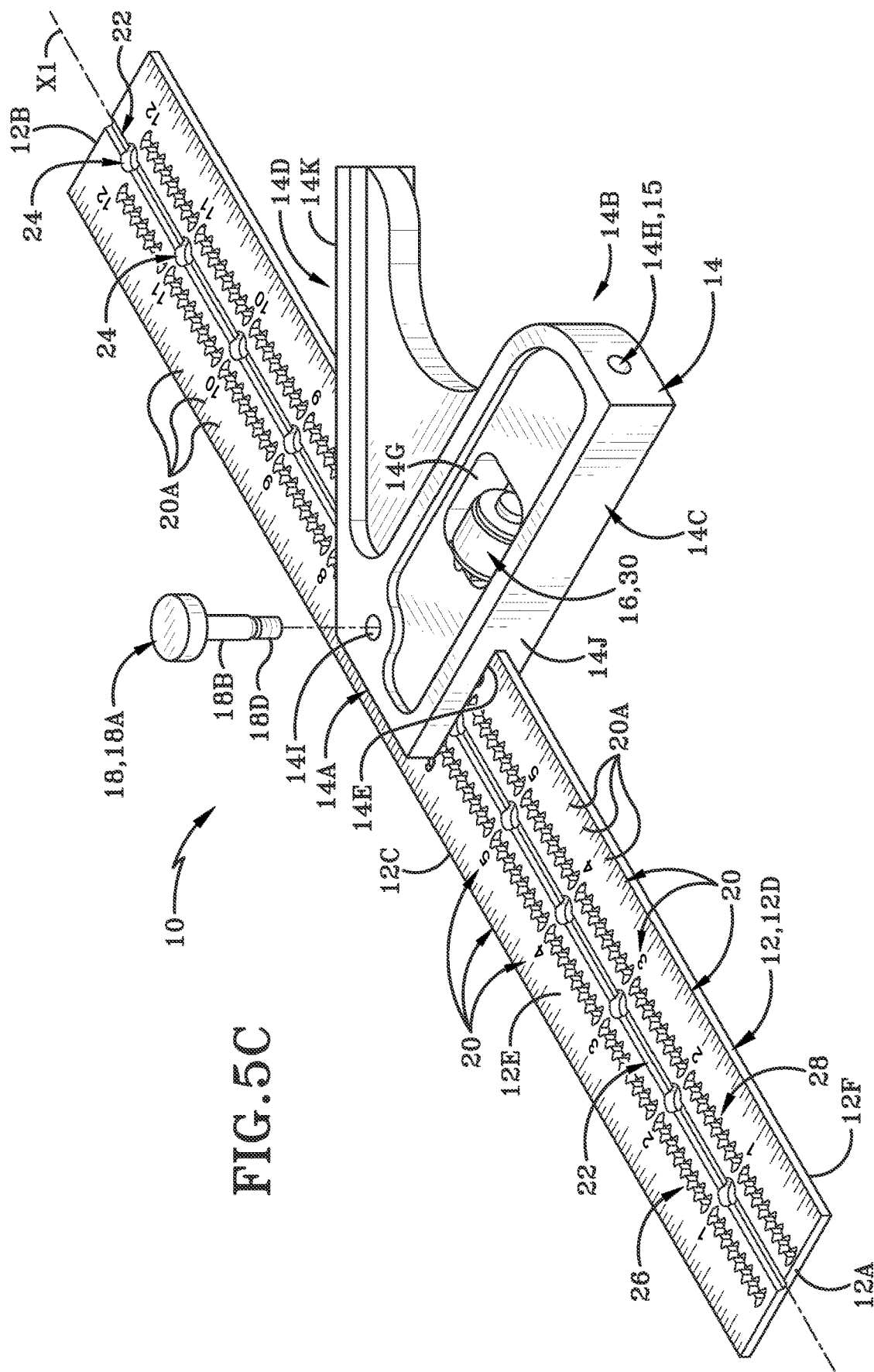
FIG. 5C is an operational view of the first embodiment of the adjustable square of FIG. 1.
Figure 5D:
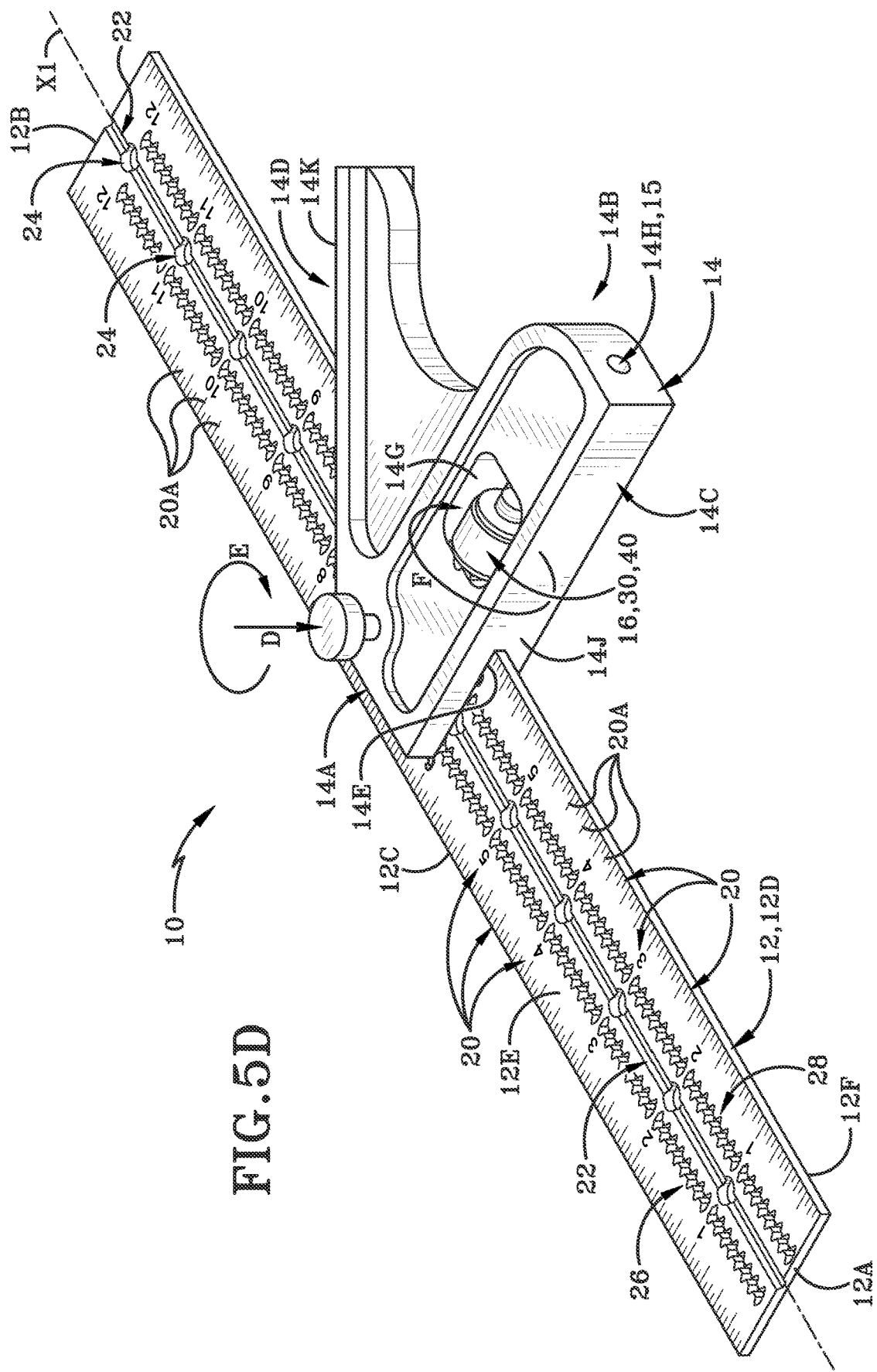
FIG. 5D is an operational view of the first embodiment of the adjustable square of FIG. 1.

With primary reference to FIG. 5C and FIG. 5D, the user moves the indexing member into the indexed position 44. To accomplish this, the user moves the indexing member 18 in a direction indicated by arrow D (FIG. 5D) to insert the indexing member 18 into the indexed bore 14I and through the indexing aperture 24 at the seven inch marking. The user rotates the gripping portion 18A in a direction indicated by arrow E (FIG. D), which, in turn, rotates the cylindrical section 18B, the tapered section 18C and the threaded end section 18D. As shown in FIG. 7, the threaded end section 18D is rotated until a portion of the tapered section 18C contacts a portion of the slot 14E of the body 14. As the diameter D5 of the cylindrical section 18B is approximately the same distance as length L2 of the minor axis X3 of the indexing aperture 24, the body 14 and the blade 12 are fixed at the 7 inch marking.

The user rotates the adjustment mechanism 30 of the locking mechanism 16 in a direction indicated by arrow F (FIG. 5D). This causes the threaded post 32 to move in a transverse direction toward the rear region 14B of the body 14, which, in turn, causes the second beveled surface 34B of the clamping member 34 to move toward the second chamfered surface 22B of the groove 22 such that the second beveled surface 34B of the clamping member 34 comes into contact with the second chamfered surface 22B. This fixes the body 14 at the desired position relative to the blade 12.

With primary reference to FIG. 6, the combination square is shown being used with a workpiece 46 having a top surface 46A and an edge 46B, and a marking instrument 50 having a tip 50A. In this example, the workpiece 46 is a piece of wood and the marking instrument 50 is a pencil; however, the workpiece may be any suitable workpiece and the marking instrument 50 may be any suitable marking instrument. In this example, the user utilizes the combination square 10 and the marking instrument 50 to scribe a line parallel to, and three inches from, the edge 46B of the workpiece 46.

To accomplish this, the user positions the first side surface 14J of the body 14 against the edge 46B of the workpiece 46. Since the body 14 has been indexed to the scale 20 at the seven inch marking, the first side surface 14J of the body 14 is at the six inch marking of the scale 20 and one of the first series of notches 26 is positioned at each full inch marking of the scale 20. The user places the tip 50A of the marking instrument 50 into one of the first series of notches 26 at the three inch marking on the scale 20. The user scribes a line by simultaneously moving the combination square 10 and the marking instrument 50 in a direction indicated by arrow G.

Figure 8:
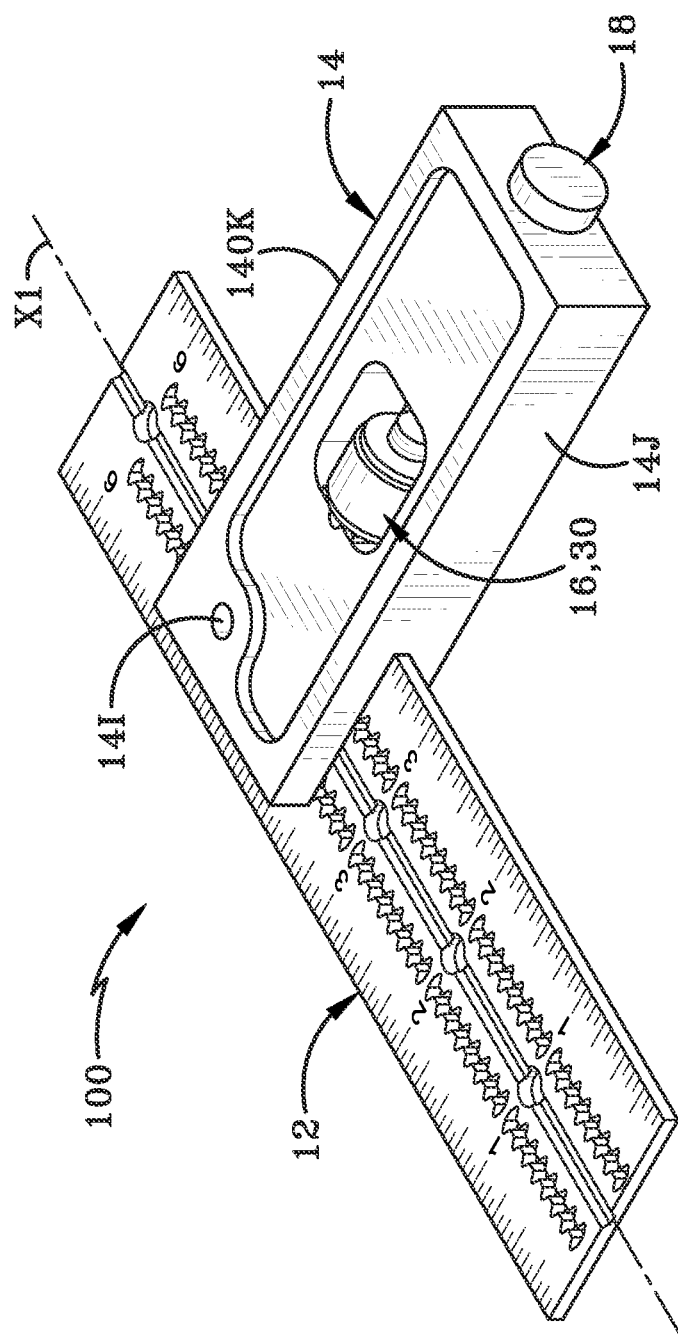
FIG. 8 is a front, top, right side isometric view of a second embodiment of an adjustable square.

Referring to FIG. 8, there is shown a second embodiment of an adjustable square in accordance with one aspect of the present disclosure. The adjustable square, which may also be referred to as a double square, is generally indicated at 100. The double square 100 is substantially identical to the combination square 10 in structure and function except that the body 14 of the double square 100 is different than the body 14 of the combination square 10. As shown in FIG. 8, the double square 10 includes a second side surface 140K that is different than the second side surface 14K of the combination square 10. Particularly, instead of the second side surface 14K being oriented at an angle of forty-five degrees relative to the central longitudinal axis X1 of the blade 12, the second side surface 140K is oriented at an angle of ninety degrees relative to the central longitudinal axis X1 of the blade 12.

Figure 9:
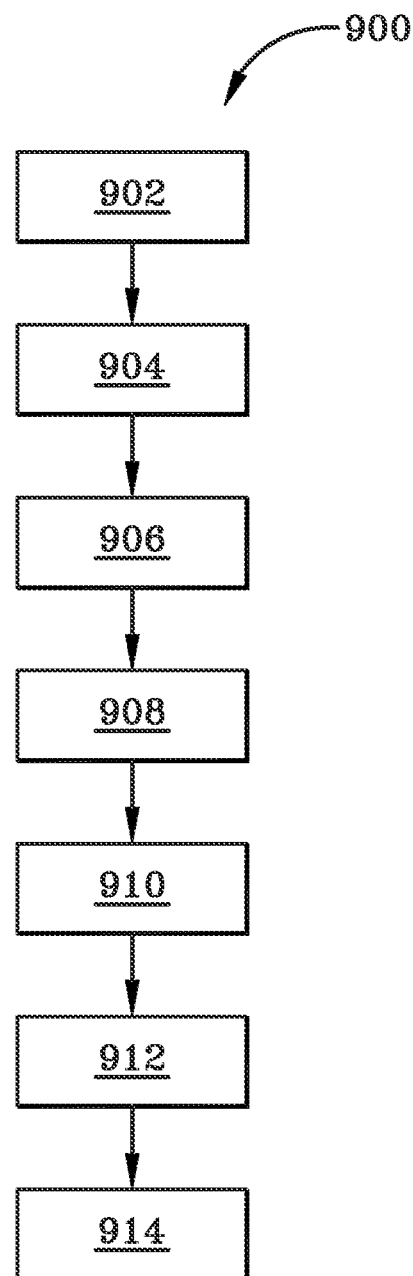
FIG. 9 is a flow chart depicting an exemplary method in accordance with one aspect of the present disclosure.

FIG. 9 depicts a method for indexing an adjustable square generally at 900. The method 900 includes positioning a body of the adjustable square at a precise known position along a scale of a blade of the adjustable square, which is shown generally at 902. The method 900 includes indexing, with an indexing member of the adjustable square, the body of the adjustable square at the precise known position, which is shown generally at 904. The method 900 further includes aligning one of a plurality of indexing apertures formed in the blade with an indexed bore formed in the body, which is shown generally at 906. The method 900 further includes inserting the indexing member into the indexed bore, which is shown generally at 908. The method 900 further includes passing the indexing member through the one of the plurality of indexing apertures, which is shown generally at 910. The method 900 further includes operably engaging a portion of the blade with the indexing member to fix the body at the desired position, which is shown generally at 912. The method 900 further includes indexing, with the indexing member, the body relative to a series of notches formed in the blade and aligned with graduations of the scale which is shown generally at 914.

The indexing member 18, together with the plurality of indexing apertures 24, enables the body 14 of the adjustable square 10 to be quickly and precisely placed at desired positions to an even greater accuracy and precision than that possible with other types of adjustable squares.

Referring to FIG. 10-FIG. 24, there is shown a third embodiment of an adjustable square in accordance with one aspect of the present disclosure. The adjustable square, which may also be referred to as a combination square, is generally indicated at 210. The combination square 210 includes a blade 212, a body 214, which may also be referred to as a head, a locking mechanism 16, an indexing member 218, and a sliding tab 220.

The indexing member 218 is utilized for indexing the body 214 precisely at known locations or positions along the blade 212. Since the body 214 is indexed precisely at known locations or positions along the blade 212, distances from the body 214 to points along the blade 212 are accurately known and can be used while utilizing the combination square 210. For example, the blade 212 may include measurement markings extending along a length of the blade 212, and the body 214 may be indexable at certain points along the blade 212 where the distance between the measurement markings and the indexable points are accurately known. If a user (not shown) of the combination square 210 desires to move the body 214 from one position to another position along the blade 212, the user can index the body 214 at the known location or position and the distance from the body 214 to the measurement markings is accurately known. This allows for greater precision when working with the combination square 210 of the present disclosure.

With continued reference to FIG. 10-FIG. 24, the blade 212 is an elongated rectangular-shaped metal plate and is configured to be operably engaged with the body 214 as more fully described below. The blade 212 includes a first end 212A, a second end 212B, a first side 212C, a second side 212D, a top 212E, and a bottom 212F. When the blade 212 is operably engaged with the body 214, the first end 212A and the second end 212B define a longitudinal direction therebetween, the first side 212C and the second side 212D define a transverse direction therebetween, and the top 212E and the bottom 212F define a vertical direction therebetween. The blade 212 further includes a central longitudinal axis X1 extending between the first end 212A and the second end 212B of the blade 212. Although the blade 212 has been described as being an elongated rectangular-shaped metal plate, it is to be understood that the blade 212 may be any suitable shape and be made of any suitable material.

The blade 212 includes a scale indicia 222, a groove 224 formed in a portion of the blade 12, a plurality of indexing apertures 226 formed in the blade 212, a series of notches 228 formed in the blade 212. The scale 222 includes graduations 222A arranged longitudinally along the blade 212. The graduations 222A include one-inch markings divided into one-sixteenth inch segments provided adjacent the first side 212C of the blade 212, and one-inch markings divided into one-thirty second inch segments provided adjacent the second side 212D of the blade 212. Although the graduations 222A have been described as utilizing U.S. customary units of measurement, the graduations 222A may utilize any suitable units of measurement. Further, although the scale 222 has been described as graduations 222A, it is to be understood that the scale 222 may utilize any suitable identifying indicia.

The groove 224 extends longitudinally from the first end 212A of the blade 212 to the second end 212B of the blade 212. The groove 224 includes a first chamfered surface 224A, a second chamfered surface 224B, and a flat surface 224C, each of which extend longitudinally from the first end 212A of the blade 212 to the second end 212B of the blade 212. The first chamfered surface 224A is provided between the first side 212C of the blade 212 and the central longitudinal axis X1 of the blade 212. The second chamfered surface 224B is provided between the second side 212D of the blade 212 and the central longitudinal axis X1 of the blade 212. The flat surface 224C is provided generally along the central longitudinal axis X1 of the blade 212 and between the first chamfered surface 224A and the second chamfered surface 224B.

Each of the plurality of indexing apertures 226 are substantially similar in construction and, as such, only one of the plurality of indexing apertures 226 will be described herein and will be designated as 226A. For example, the indexing aperture 226A is substantially tear drop in shape with an oval shaped bottom proximate the second side 212D and a point at a top side proximate the first side 212C. The indexing aperture 226A is provided at each inch marking and extends between the top 212E and bottom 212F of the blade 212 and through the first chamfered surface 224A, second chamfered surface 224B, and the flat surface 224C of the groove 224. Stated otherwise, the plurality of indexing apertures 226 are evenly spaced along a length of the blade 212. Although the plurality of indexing apertures 226 have been described as being teardrop in shape, it is to be understood that the plurality of indexing apertures 226 may be any suitable shape. Further, although the plurality of indexing apertures 226 have been described as being positioned at each one inch marking along the blade 212, it is to be understood that the indexing apertures 226 may be placed in any suitable position.

The series of notches 228 are substantially offset diamond-shaped cutouts formed between the top 212E of the blade 212 and the bottom 212F of the blade 212. The first series of notches 228 extend longitudinally along the blade 212 and are provided between the first side 212C of the blade 212 and the central longitudinal axis X1 of the blade 212. The series of notches 228 are positioned such that one notch of the series of notches 228 is positioned at each sixteenth-inch marking, with each odd numbered sixteenth facing toward the first side 212C and each even numbered sixteenth facing towards the second side 212D.

The series of notches 228 are utilized for marking purposes as more fully described below. Although the series of notches 228 have been described as being offset diamond-shaped cutouts, it is to be understood that the series of notches 228 may be any suitable shape. Further, although the series of notches 228 have been described as being positioned at the one-sixteenth inch marking, along the blade 212, it is to be understood that the series of notches 228 may be placed in any suitable position.

The body 214 includes a front region 214A, a rear region 214B, a first side region 214C, and a second side region 214D. The body 214 further includes a first slot 214E, a second slot 214F, a region 214G, an oval channel 214H, a top surface 214J, a bottom surface 214K, and an indexed bore 214L.

The first slot 214E is formed in the body 214 proximate the front region 214A, the first side region 214C, and the second side region 214D of the body 214 and extends transversely from the front region 214A towards the rear region 214B of the body 214. The second slot 214F is formed in the body 214 proximate the rear region 214B, the first side region 214C, and the second side region 214D of the body 214 and extends transversely from the front region 214A towards the rear region 214B of the body 214. A region 214G is formed between a top surface 214J and a bottom surface 214K.

Figure 11:
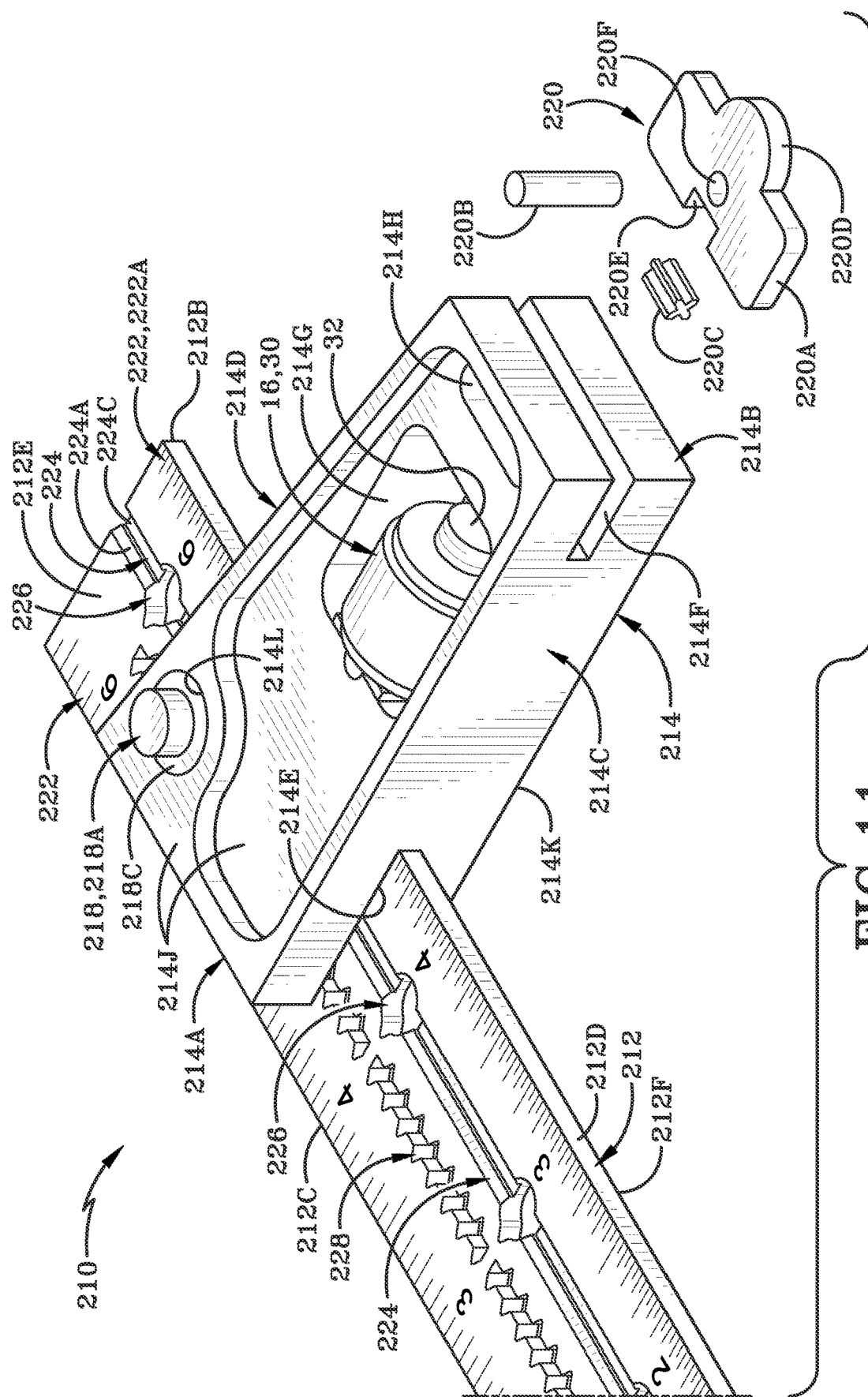
FIG. 11 is a front, top, right side isometric partially exploded view of the third embodiment of the adjustable square.

The oval channel 214H is located on a top surface 214L of the body and is generally oval in shape. The oval channel 214H and the second slot 214F permit the sliding tab 220 to move within the body 214. Referring specifically to FIG. 11, a partially exploded view of the sliding tab 220 is shown. The sliding tab 220 comprises three parts, a body 220A, a locking pin 220B and a restrictor 220C. The body 220A generally has a bulbous portion 220D, a recess 220E and a through hole 220F. The bulbous portion 220D is generally semicircular and is operative to be grasped by a user during operation as will be discussed later. The recess 220E is operative to fit the restrictor 220C within it while the through hole is operative to accept the locking pin 220B. The locking pin 220B is generally cylindrical in shape while the restrictor is shown as an X shape. While the body 220A, locking pin 220B and restrictor 220C have been described as being separate components, it is to be understood that they may be different shapes to effectuate the same result. Further, while the body 220A, locking pin 220B and restrictor 220C have been described as separate pieces, they may be operatively connected and may be otherwise integrally formed with the body 214.

Figure 12:
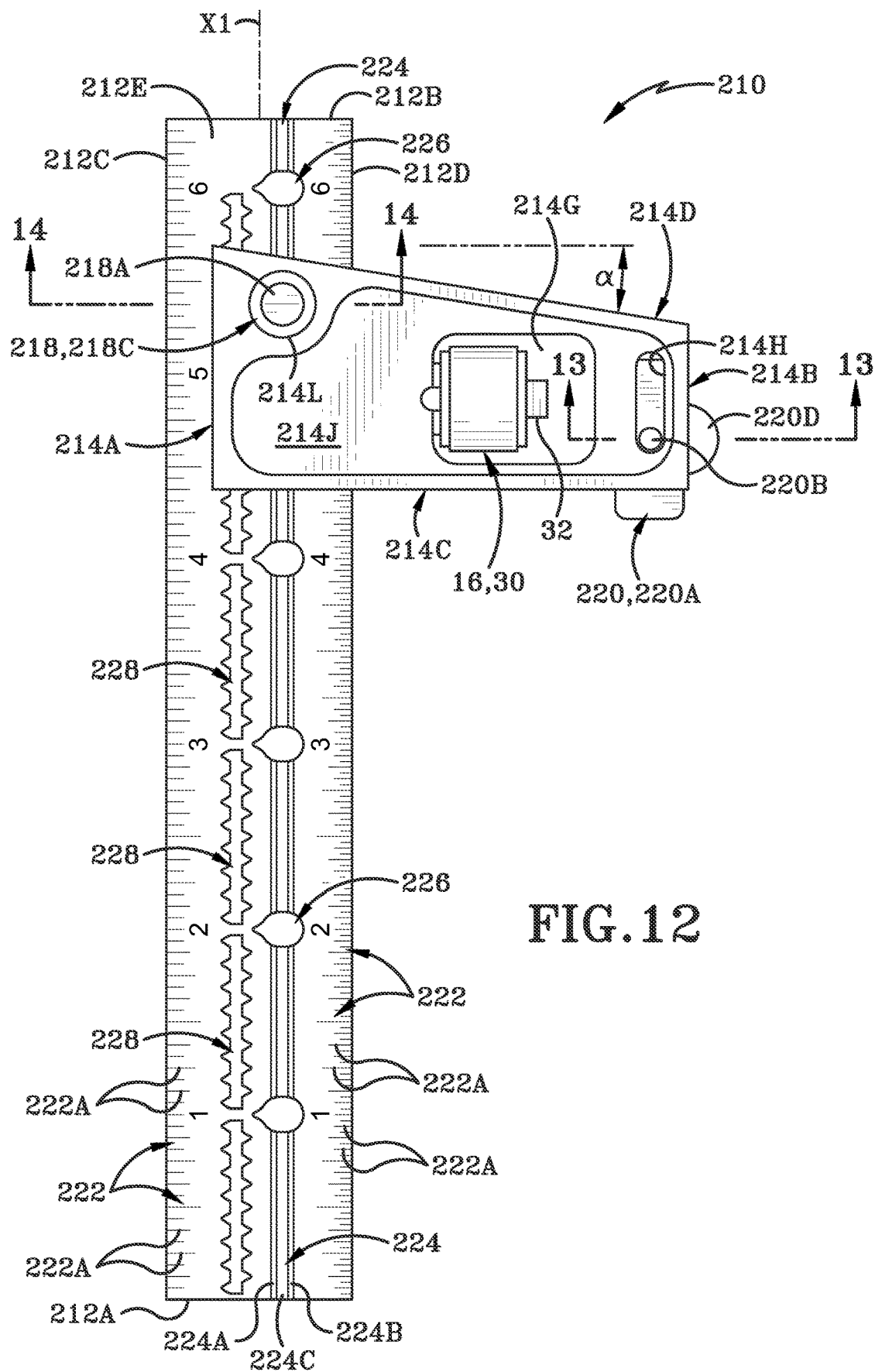
FIG. 12 is a top plan view of the adjustable square of FIG. 10.
Figure 13:
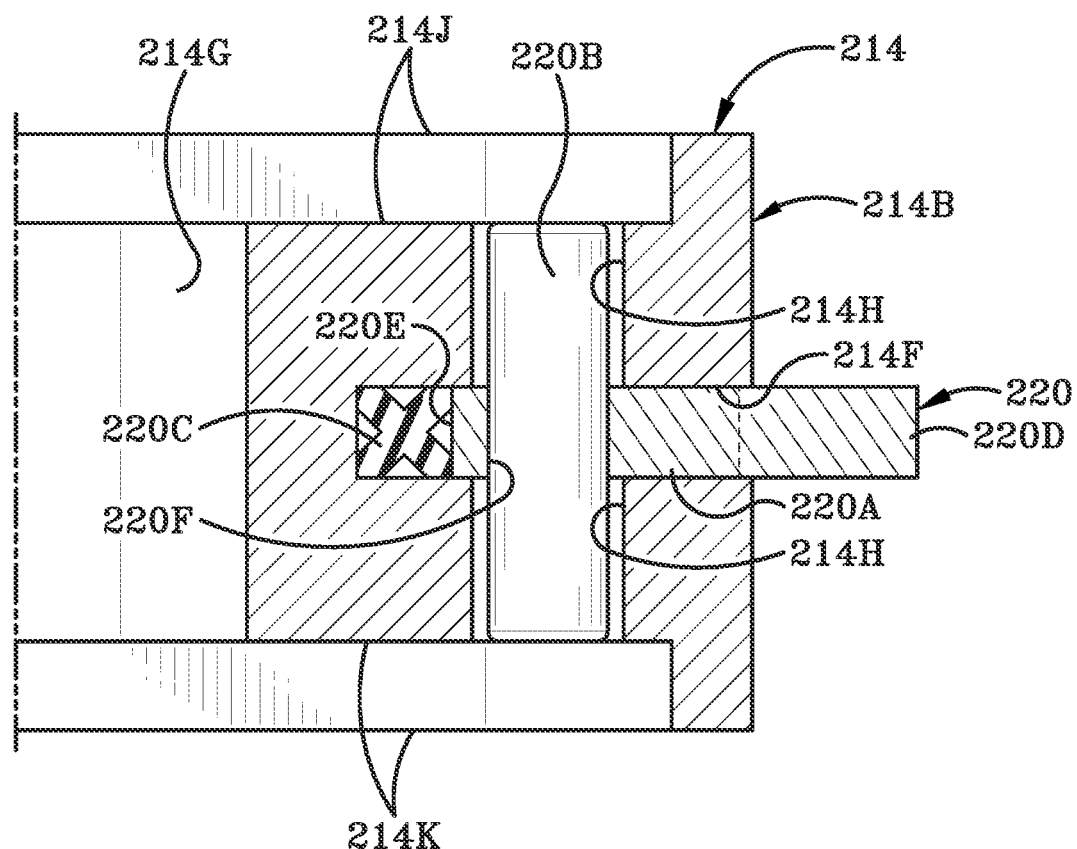
FIG. 13 is a cross-sectional view of a body of the adjustable square along line 13-13 of FIG. 12.

Referring specifically to FIG. 13, a cross-sectional view of the body 214 of the adjustable square 210 along line 13-13 of FIG. 12 is shown. Specifically, this view shows the second recess 212J accepting the restrictor 220C and a portion of the body 220A so as to prevent the body 220A from plunging deeper into the body 214. Simultaneously, this allows the locking pin 220B to freely move as a result of moving the body 220A in a longitudinal manner.

Figure 10:
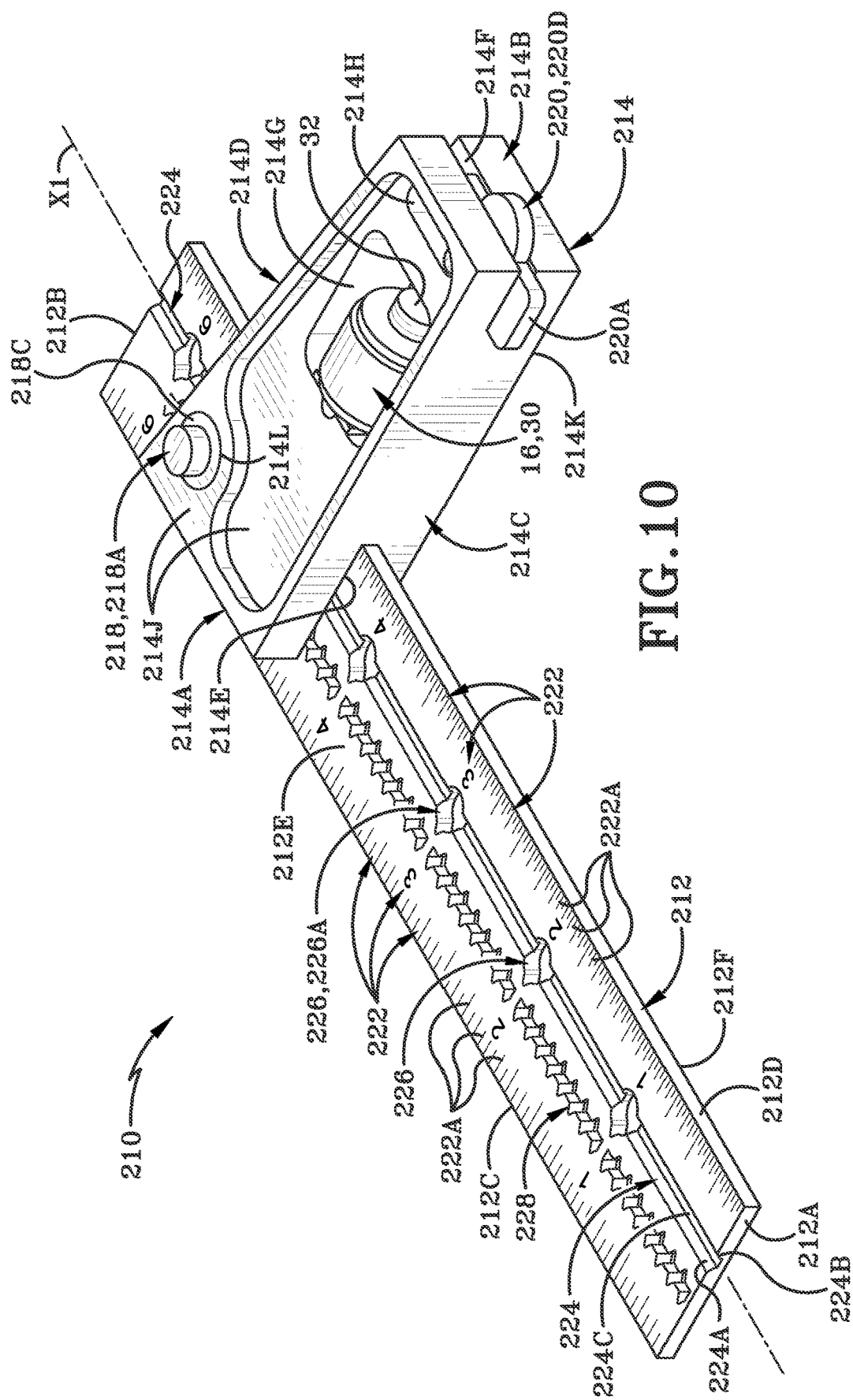
FIG. 10 is a front, top, right side isometric view of a third embodiment of an adjustable square.

With primary reference to FIG. 10 and FIG. 12, the locking mechanism is identical to the locking mechanism 16 of the first embodiment. This may be seen in FIG. 3 of the first embodiment most completely. Further included with the locking mechanism is an adjustment mechanism 30, and a threaded post 32. The adjustment mechanism 30 is operably engaged with the threaded post 32. The threaded post 32 includes a clamping member 34 proximate the front end 16A of the locking mechanism 16. The clamping member 34 includes a first beveled surface 34A, a second beveled surface 34B, and a flat surface 34C, each of which extend longitudinally between the first side region 214C and the second side region 214D of the body 214. The first beveled surface 34A, the second beveled surface 34B, and the flat surface 34C are complementary in shape to the first chamfered surface 224A, the second chamfered surface 224B, and the flat surface 224C of the groove 224 of the blade 212.

The locking mechanism 16 is configurable between an unlocked position 38 and a locked position 40. A channel within the body 214 (not shown in this embodiment but substantially identical to 14F) is configured to receive the threaded post 32 and the clamping member 34 of the locking mechanism 16 such that the adjustment mechanism 30 is positioned within an aperture of the body 214, and the threaded post 32 extends transversely through the channel, while the clamping member 34 is positioned within the channel proximate the slot 214E. The adjustment mechanism 30 is configured to move the threaded post 32 and the clamping member 34 in a transverse direction to move the locking mechanism 16 between the unlocked position 38 and the locked position 40 as more fully described below.

The blade 212 is configured to be releasably secured within the slot 214E via the locking mechanism 16. More particularly, the second beveled surface 34B of the clamping member 34 is configured to releasably contact the second chamfered surface 224B of the groove 224 of the blade 212. As such, when the locking mechanism 16 is in the unlocked position 38, the second beveled surface 34B of the clamping member 34 is not in contact with the second chamfered surface 224B of the groove 224 allowing the blade 212 to move through the slot 214E in the longitudinal direction. When the locking mechanism 16 is in the locked position 38, the second beveled surface 34B of the clamping member 34 is in contact with the second chamfered surface 224B of the groove 224 and the blade 212 is no longer movable within the slot 214E.

Further shown on the adjustable square 210 is an angle α. The angle α is the complementary angle to the angle between the front region 214A and the second side region 214D. As will be discussed with respect to operation the adjustable square 210 is operable to layout dovetail joints (or simply "dovetails"). When laying out dovetails, it is optimal to know lay out the dovetails with a specific ratio. Common ratios are 1:6, 1:7 and 1:8. In this instance, the ratios correspond to one unit horizontal to six, seven or eight units, respectively, drawn horizontal. While an exemplary embodiment of the 1:8 is shown, any such layout is possible. In the exemplary embodiment of 1:8, a has a value of about 7 degrees. In the exemplary embodiment of 1:7, a has a value of about 8 degrees. While in an alternative embodiment of 1:6, a has a value of about 9.5 degrees.

Figure 14:
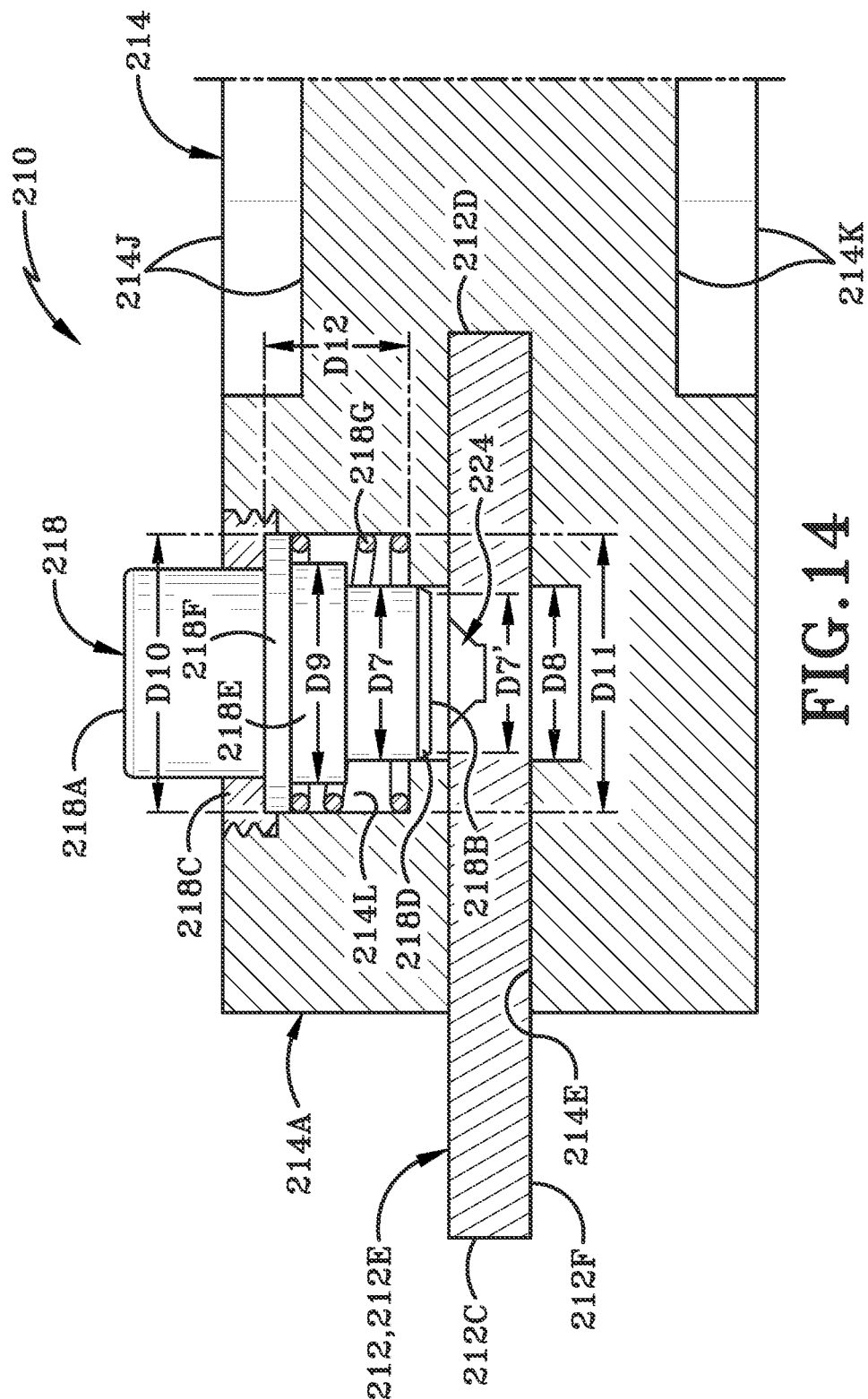
FIG. 14 is a cross sectional view of the adjustable square along line 14-14 of FIG. 13.

Continuing to FIG. 14, a cross-sectional view of the body 214 of the adjustable square 210 along line 14-14 of FIG. 12 is shown. The indexed bore 214L includes the indexing member 218. The indexing member 218 includes a first end 218A and a second end 218B. Proximate where the indexing member 218 meets the indexed bore 214L is a spring cap 218C. Further there is a tapered region 218D proximate the second end 218B that has a diameter D7. The diameter D7 is slightly smaller than a first diameter D8 of the indexed bore 214L. Laterally above the tapered region 218D is an intermediate diameter D9 region 218E, a poppet region 218F with a diameter D10 along with a spring 218G. The indexed bore 214L has a second diameter D11 that is larger than the first diameter D8 but slightly larger than the diameter D10. Generally speaking, the indexed bore 214L is formed in the body 214 proximate the front region 214A of the body 214. Further, there is a distance when the spring 218G is not depressed shown as D12.

Figure 18:
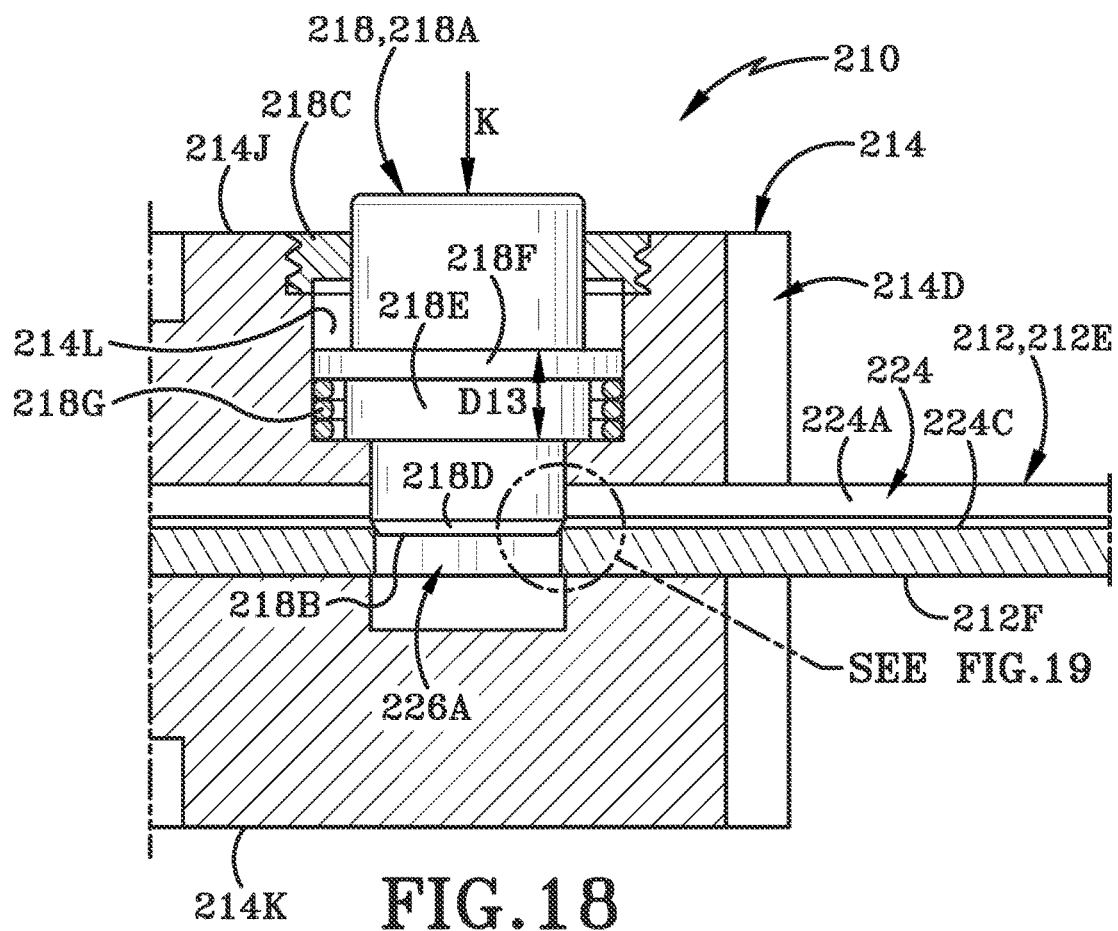
FIG. 18 is a further operational view of the third embodiment of the adjustable square of FIG. 10.

As will be discussed further with respect to operation, the indexing member 218 at its second end 218B at the tapered region 218D is operative to nest and hold within the indexing apertures 226 (FIG. 18). The tapered region 218D will engage the indexing aperture 226 and is operative to retain the precise location of the indexing aperture 226 chosen and when the locking mechanism 16 is engaged as will be discussed with respect to operation. The tapered region 218D will not interface with the blade 212 to prevent movement of the body 214 when sliding along the groove 224 of the blade 212. The tapered region 218D will instead slide along the top 212E of the blade 212 until it is depressed and makes contact with at least a portion of the indexing aperture 226. When the tapered region 218D is in contact with at least a portion of the indexing aperture 226, movement of the body 214 with respect to the blade 212 may cease. In this figure the indexing aperture 226 is not engaged with the tapered region 218D as the indexing aperture 226 is not aligned at the moment and instead the aligned with the groove 224 of the blade 214 alone.

Having described the structure of the combination square 210 and its associated components, reference is now made to FIG. 15 through FIG. 24 to depict one exemplary use and operation of the combination square 210. As stated above, the indexing member 218 is configured to index the body 214 at particular positions along the blade 212, such as, for example, at every full inch along the length of the blade 212. This further allows the series of notches 28 to be properly indexed to the body 214.

Figure 15:
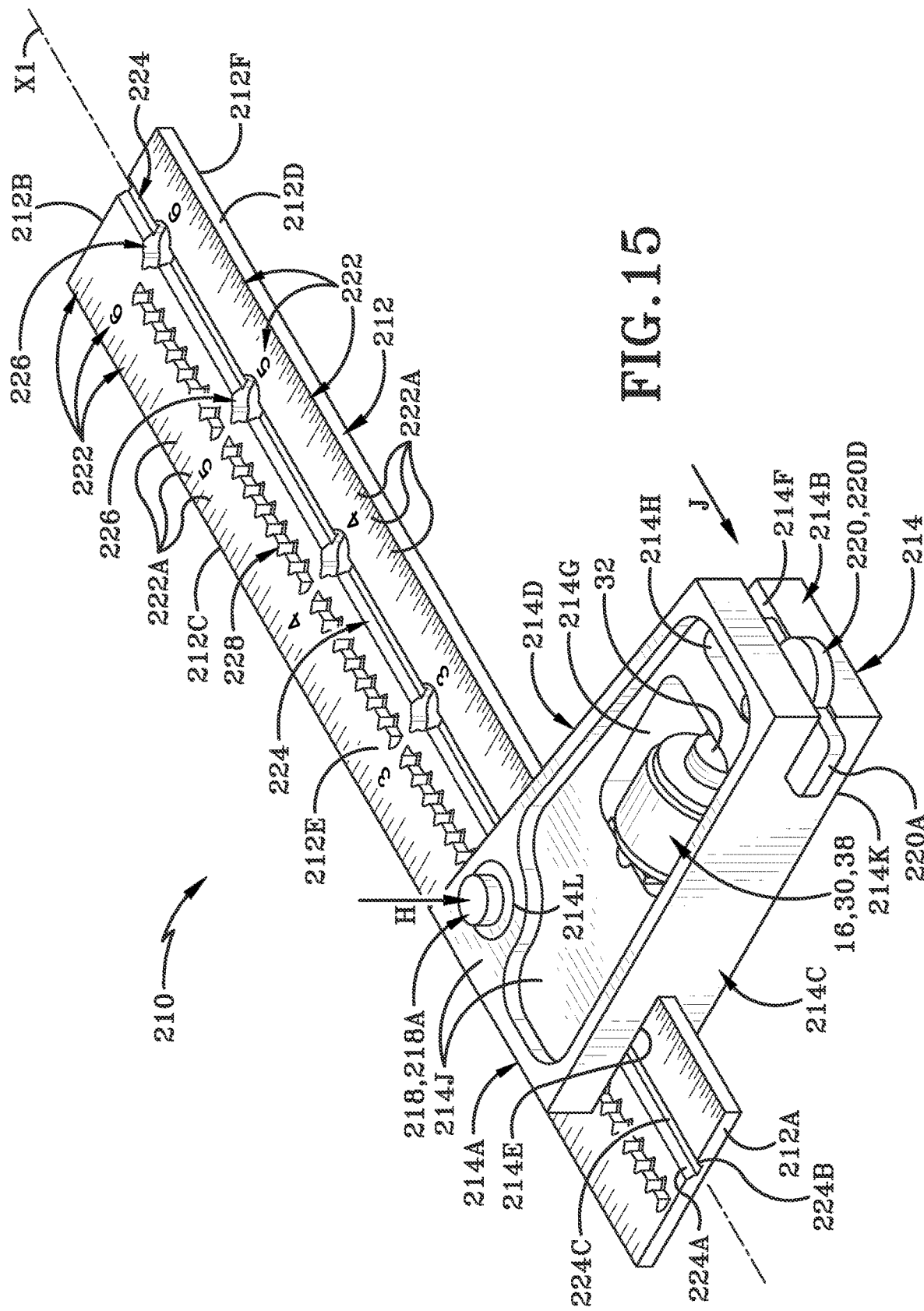
FIG. 15 is an operational view of the third embodiment of the adjustable square.
Figure 16:
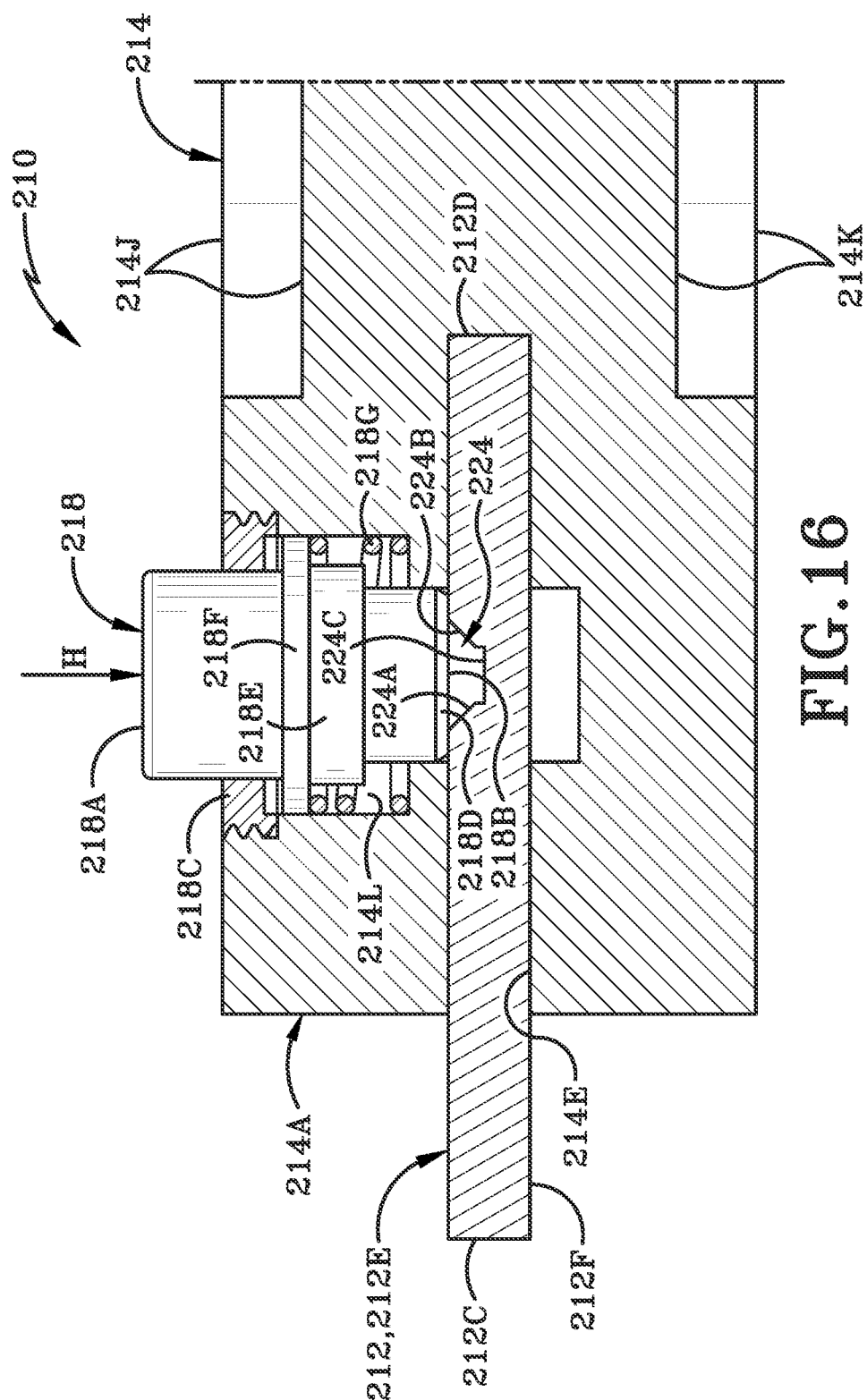
FIG. 16 is an operational view of an indexing mechanism on the third embodiment of the adjustable square.

With primary reference to FIG. 15 and FIG. 16, the locking mechanism 16 is shown to be loosened 38 or otherwise not engaged. The indexing member 218 is shown in an unengaged position and may be depressed in the direction of arrow H in order to attempt to engage the indexing member 218 within the indexing aperture 226. In order to depress the indexing member 218 spring bias must be overcome. If there is no indexing aperture 226 at the precise location, the body 214 is free to move. Specifically, the body 214 is then able to be slid along the blade 212 in the direction of arrow J. Referring to FIG. 16 specifically, the tapered region 218D will not interface in order to prevent movement when engaged with the groove 224 and may slide freely in the direction of arrow J. The tapered region 218D will slide along the top 212E of the blade 214 until it is depressed and makes contact with an indexing aperture 226, as seen later with respect to FIG. 18. While shown herein as the indexing member 218 being depressed in a vertical manner to engage or attempt to engage with the indexing aperture 226, alternative embodiments allow for an axial depression depending on the desired implementation of the combination square 210.

Figure 17:
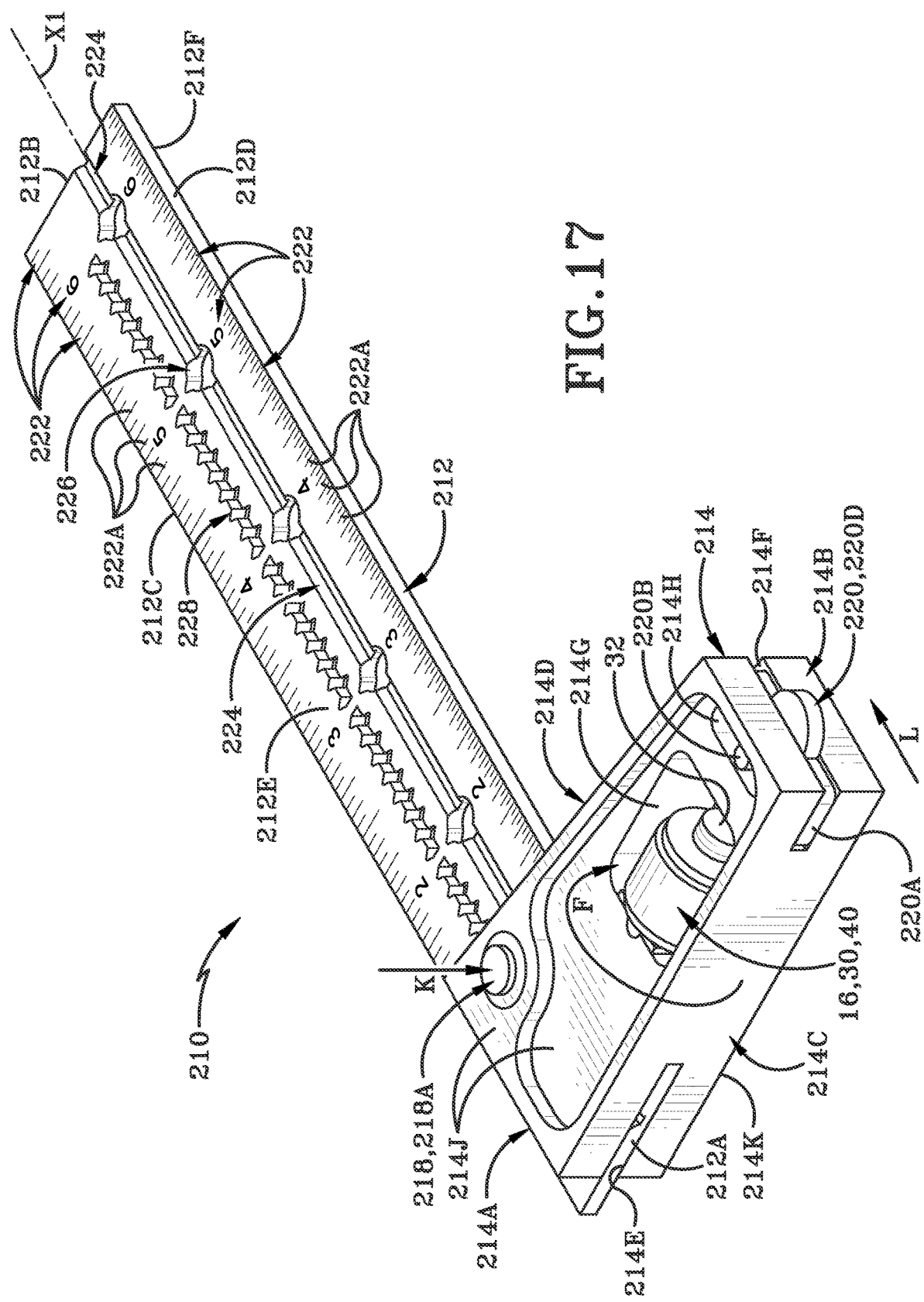
FIG. 17 is an operational view of the third embodiment of the adjustable square of FIG. 10.
Figure 19:
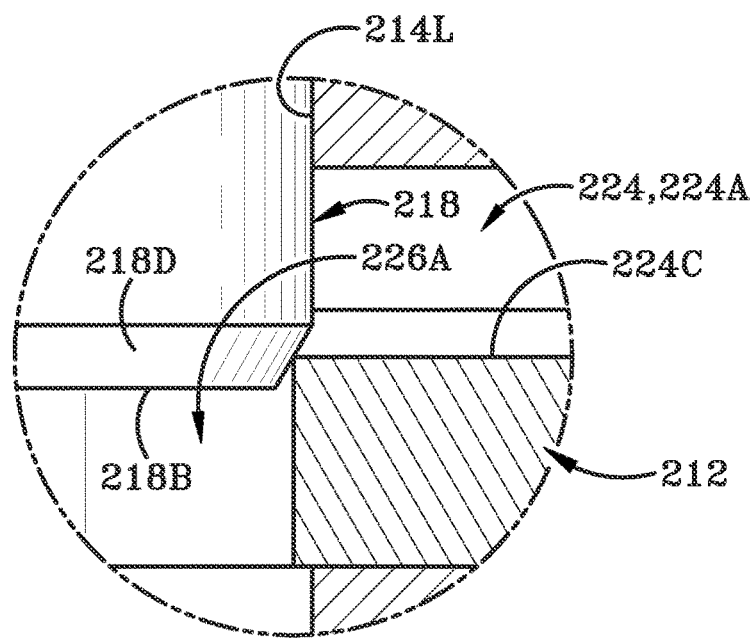
FIG. 19 is a further operational view of third embodiment of the adjustable square along the highlighted region in FIG. 18.

Referring specifically to FIG. 17, FIG. 18 and FIG. 19, a further operational view is shown. The indexing member 218 is depressed in the direction of arrow K to prevent the body 214 to move relative to the blade 212. The body 214 is then no longer moved as the blade 212 is held in engagement with the body 214. The tapered region 218D interfaces in order to prevent movement when engaged with the indexing aperture 226 and prevent free movement. The tapered region 218D will make contact with indexing aperture 226A while the spring is depressed to a distance of D13 as shown in FIG. 18. The tapered region 218D allows the indexing member to be held in engagement with the indexing aperture 226. The indexing member 218 is in a first position when the indexing member 218 is disengaged with the blade 212 and a second position when the indexing member 218 is engaged with the blade 212.

Then, the user rotates the adjustment mechanism 30 of the locking mechanism 16 in a direction indicated by arrow F (FIG. 17). This causes the threaded post 32 to move in a transverse direction toward the rear region 214B of the body 214, which, in turn, causes the second beveled surface 234B of the clamping member 234 to move toward the second chamfered surface 224B of the groove 224 such that the second beveled surface 34B of the clamping member 34 comes into contact with the second chamfered surface 224B. This fixes the body 214 at the desired position relative to the blade 212. The user may then move the sliding tab 220 to a neutral position via arrow L so as to be flush with the first side region 214C of the body 214.

Figure 20:
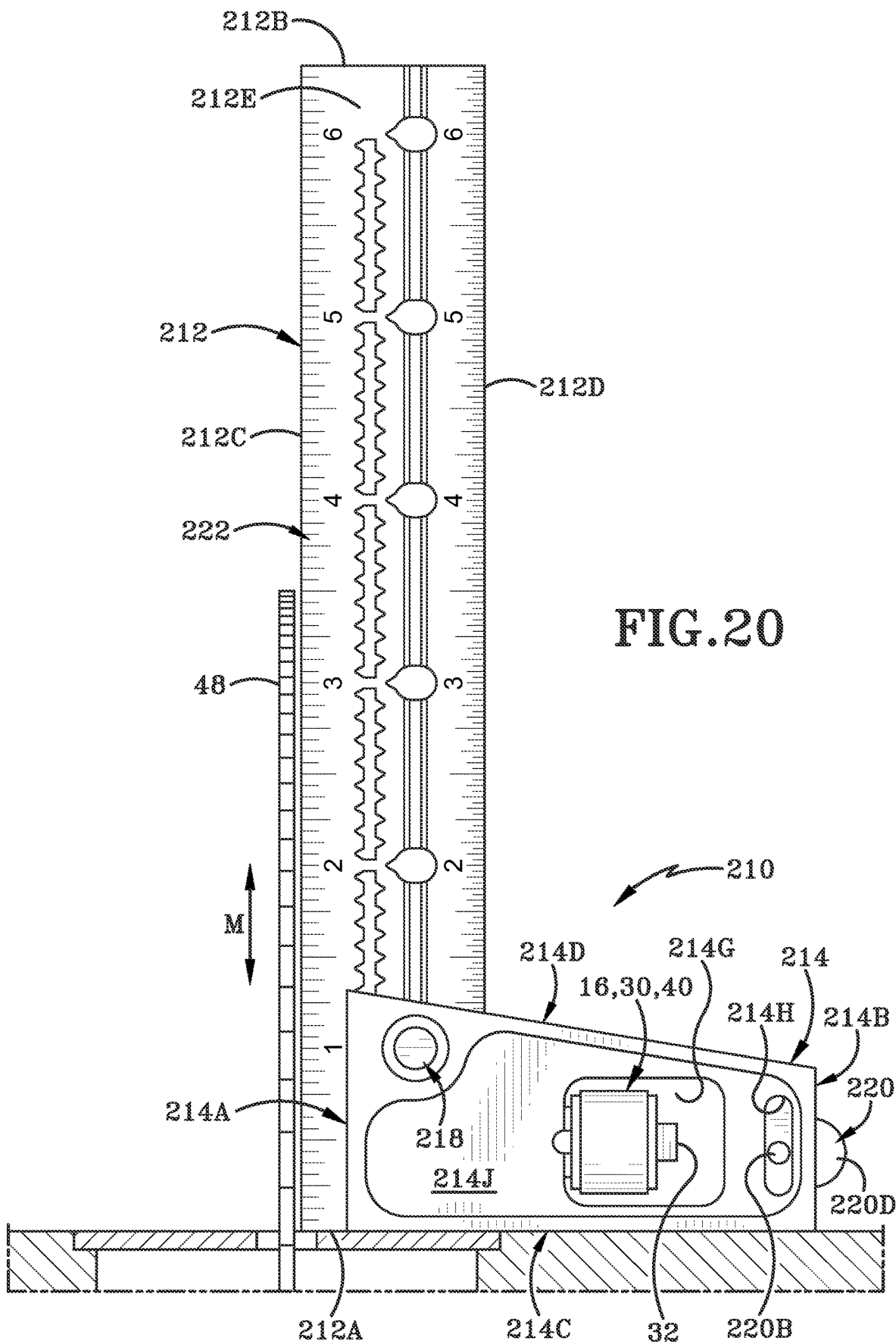
FIG. 20 is a further operational view of the third embodiment of the adjustable square of FIG. 10.
Figure 21:
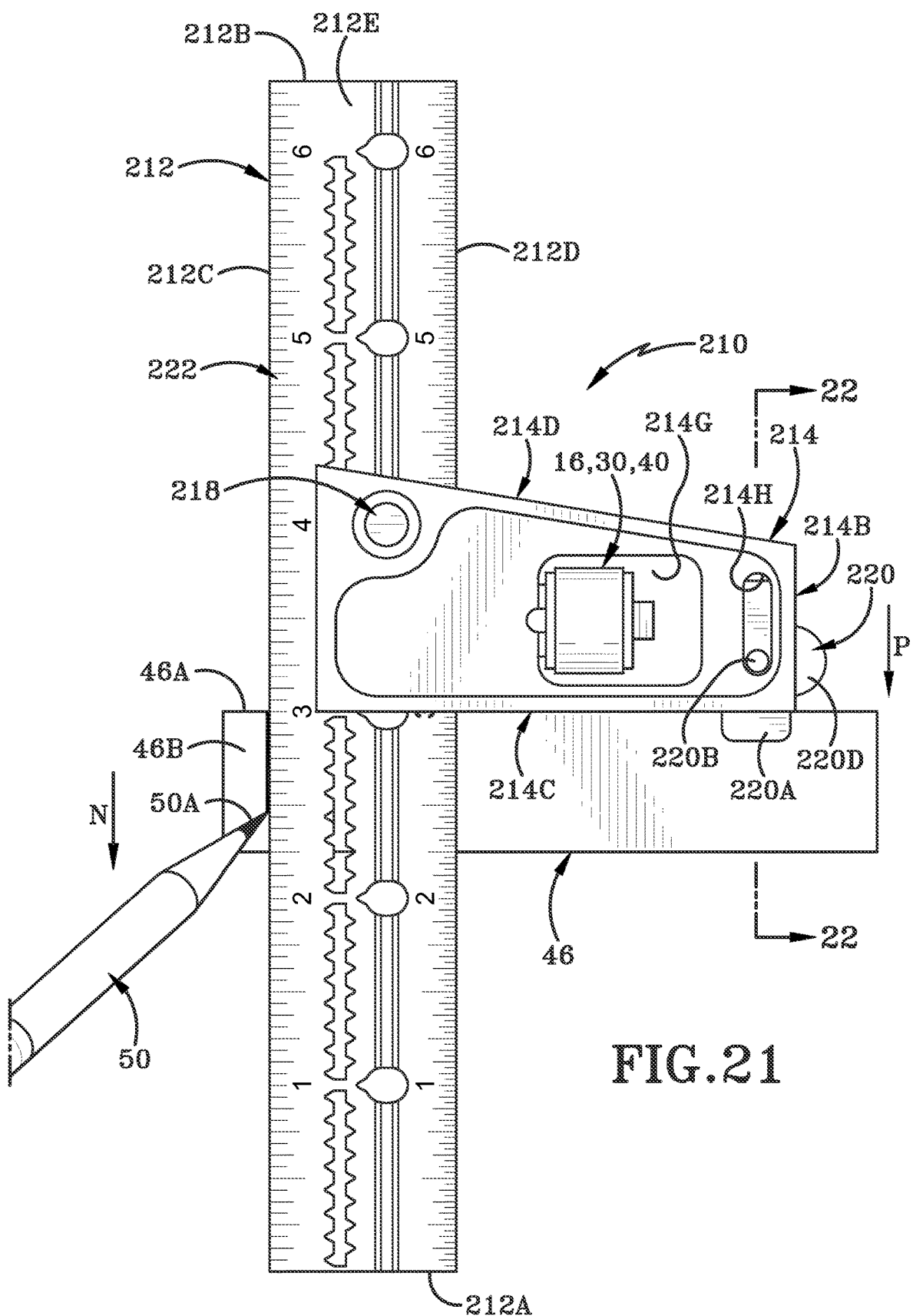
FIG. 21 is a further operational view of the third embodiment of the adjustable square of FIG. 10.

Referring to FIG. 20, a further operational view is shown. A saw blade 48 or other such similarly situated device when the device is engaged at the one inch marking may act as a square in order to move the blade 48 to be a perfect 90 degree edge. The saw blade 48 may then be squared up and adjusted to a proper depth via arrow M.

Figure 22:
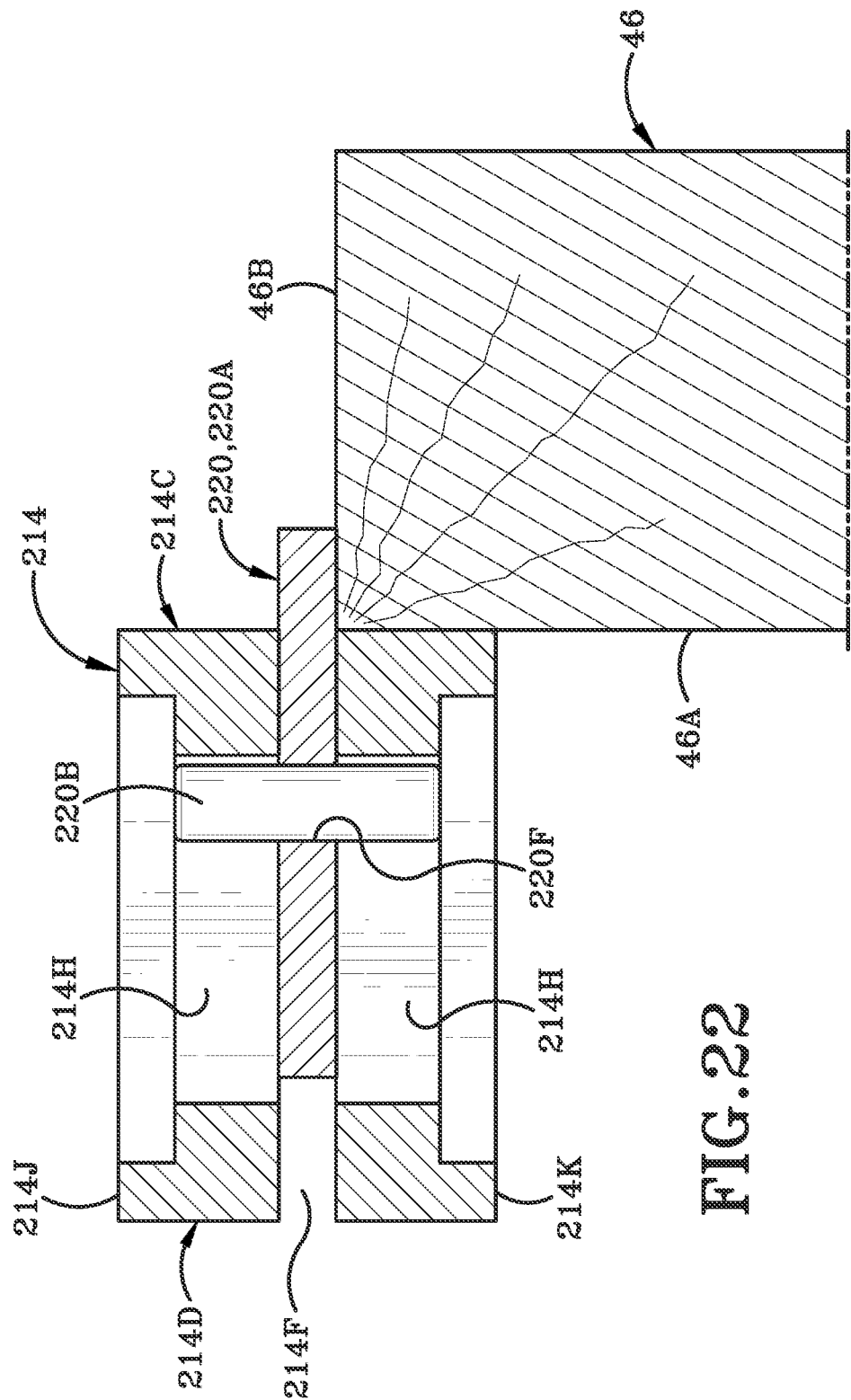
FIG. 22 is a further operational view of the third embodiment of the adjustable square along line 22-22 of FIG. 21.

Continuing to FIG. 21, FIG. 22, FIG. 23 and FIG. 24, further operational views are shown. Specifically, the user may desire to make dovetail joints or other similarly situated joining devices out of wood. First, the user may draw a starting line with the pencil or similarly situated marking device 50 on the edge 46B of a work piece 46 along direction of arrow N. A series of the lines will be made on the edge 46B. These lines will be easy to keep straight by moving the sliding tab 220 in the direction of arrow P to move the body 220A of the sliding tab 220 in engagement with the edge 46B of the work piece 46. This may be further evidenced by FIG. 22 showing line 22-22 of FIG. 21 with the body 220A of the sliding tab 220 firmly against the work piece 46.

Figure 23:
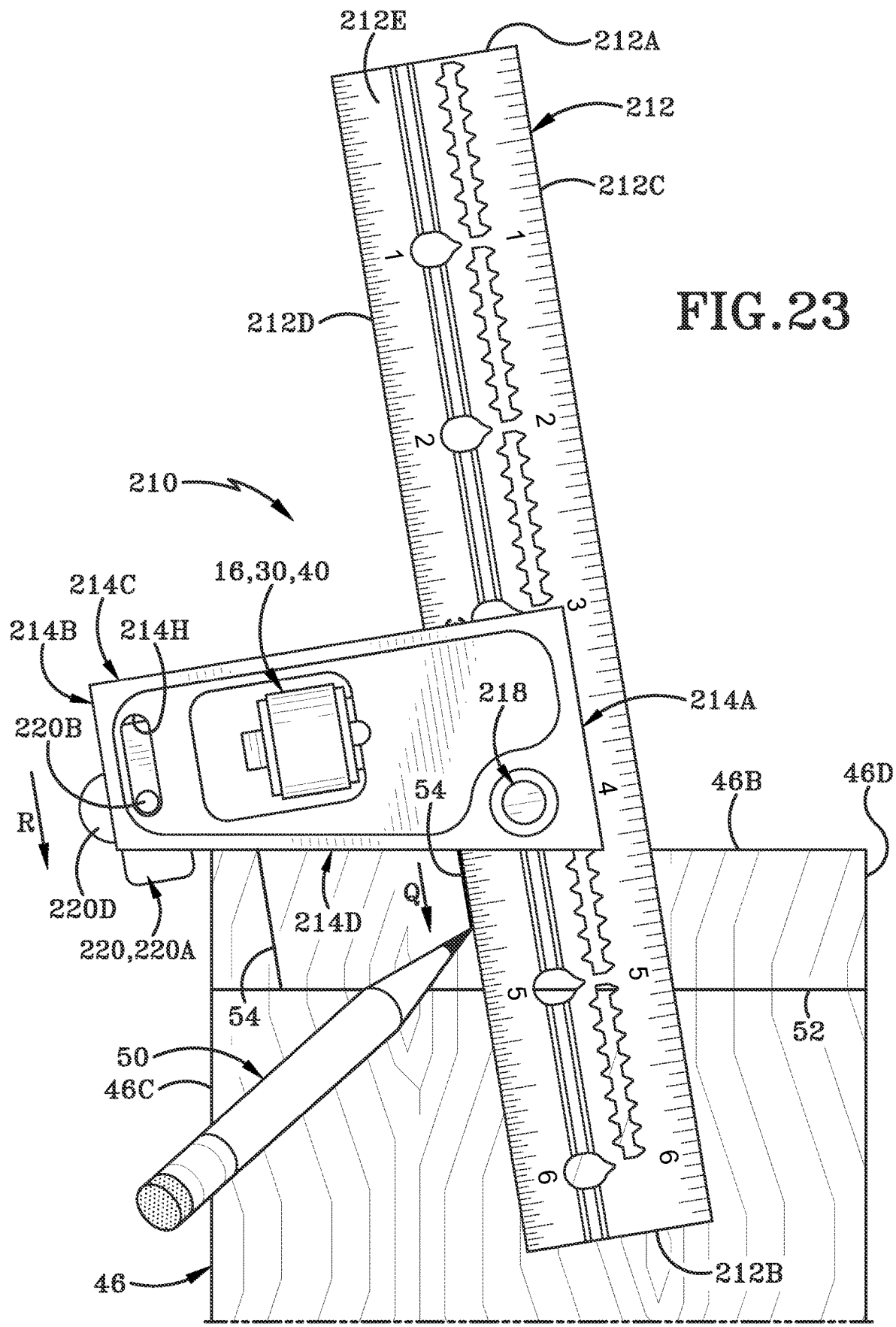
FIG. 23 is a further operational view of the third embodiment of the adjustable square of FIG. 10.

Continuing on to FIG. 23, a baseline 52 has been marked or otherwise struck. Then, the second side region 214D is abutted to be flat against the board with the rear region 214B facing a left side 46C of the work piece 46. A series of lines may then be drawn as the left facing angles may then be marked via arrow Q as shown as lines 54. Further, the user may then move the sliding tab 220 via arrow R in order to further brace the square 210 against the work piece 46.

Then, when the right side 46D is reached, the tool 210 may be flipped over so that the rear region 214B faces the right side 46D. A corresponding number of right facing angles may then be marked in a similar fashion. The resultant shape would be the two angled lines forming that of a dovetail joint and would be able to be removed with a chisel or other known cutting device.

Figure 24:
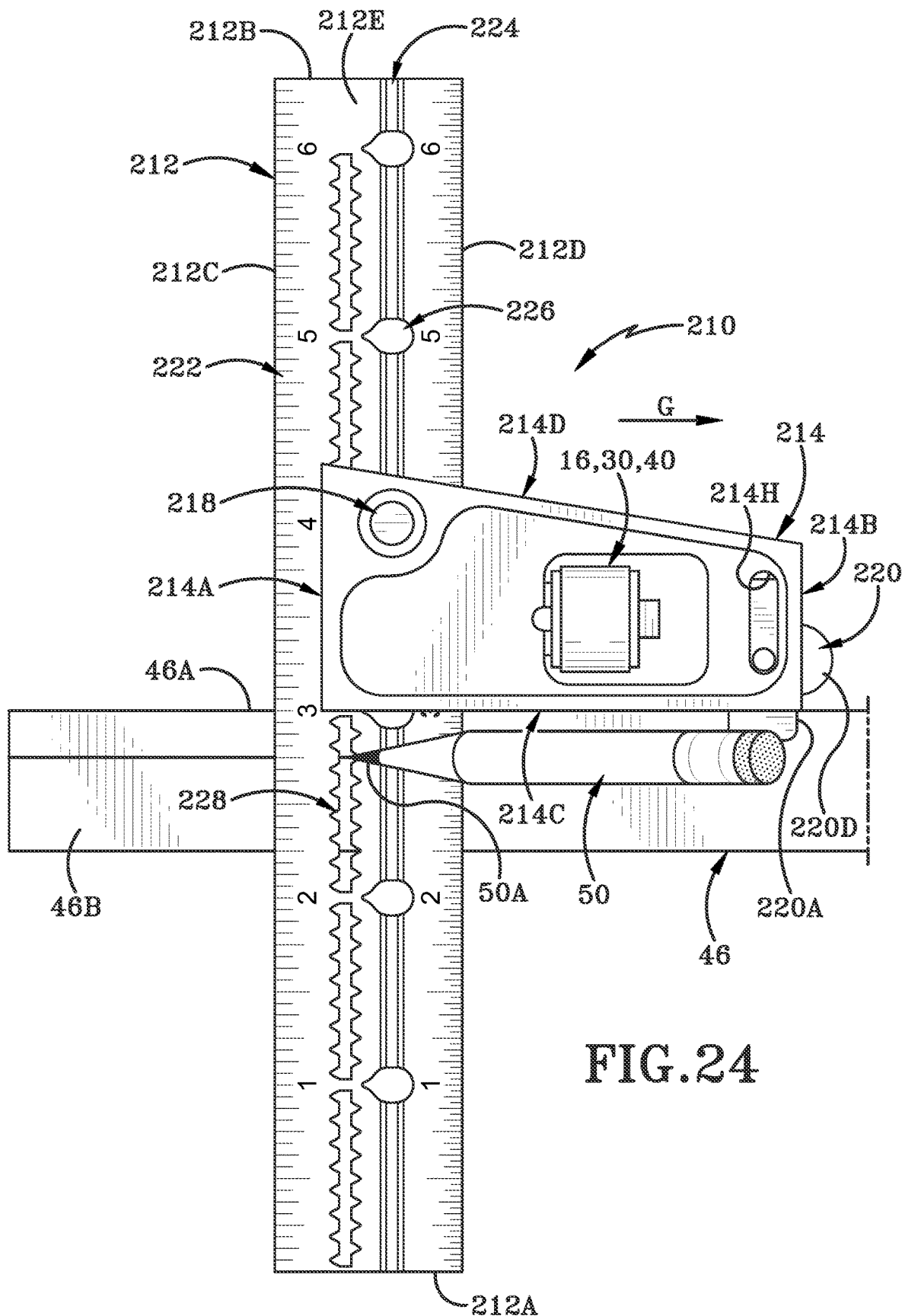
FIG. 24 is a further operational view of the third embodiment of the adjustable square of FIG. 10.

With primary reference to FIG. 24, the combination square 210 is shown being used with a workpiece 46 having a top surface 46A and an edge 46B, and the marking instrument 50 having the tip 50A. In this example, the user utilizes the combination square 210 and the marking instrument 50 to scribe a line parallel to, and a quarter inch from, the edge 46B of the workpiece 46.

To accomplish this, the user positions the first side surface 214C of the body 214 against the edge 46B of the workpiece 46. Since the body 214 has been indexed to the scale 222 at the four inch marking, the first side surface 214C of the body 214 is at the three inch marking of the scale 222 and one of the notches 228 is positioned at each full inch marking of the scale 222. The user places the tip 50A of the marking instrument 50 into one of the series of notches 228 at the two and three quarters inch marking on the scale 222. The user scribes a line by simultaneously moving the combination square 210 and the marking instrument 50 in a direction indicated by arrow G.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An adjustable square comprising:
   a blade defining a groove and a plurality of discrete indexing apertures therein, wherein the groove and the plurality of discrete indexing apertures are in fluid communication with one another;
   a body;
   a slot formed in the body for movably receiving the blade;
   a locking mechanism operably engaged with the body for releasably securing the blade within the slot; and
   an indexing member operably engaged and retained within the body for releasably securing the blade inside one discrete indexing aperture of the plurality of discrete indexing apertures, wherein the indexing member is operably engaged with the body and the blade independently of the locking mechanism.

2. The adjustable square of claim 1, wherein the body is formed with a bore, and the indexing member is carried within the bore.

3. The adjustable square of claim 2, wherein the indexing member is not slidable within the indexed bore when provided in a disengaged position inside of the indexed bore.

4. The adjustable square of claim 3, wherein the indexing member moves within the bore in an axial manner when actuated from the disengaged position to an engaged position.

5. The adjustable square of claim 4, wherein the indexing member is retained within the bore in both the engaged position and the disengaged position.

6. The adjustable square of claim 4, wherein the indexing member further comprise:
   a spring cap located at a first end of the indexed bore and; and
   a spring operative to control axial movement of the indexing member within the indexed bore.

7. The adjustable square of claim 6, wherein the indexing member includes a first end and second end and a tapered region at the second end with a first diameter closer to the first end and a second diameter closer to the second end and the second diameter is less than the first diameter.

8. The adjustable square of claim 6, further comprising:
   a larger diameter region of the indexing member below a spring cap operative to retain the indexing member within the indexed bore through interfacing of the larger diameter region with the spring cap.

9. The adjustable square of claim 1, further comprising:
   a first position of the indexing member when the indexing member is disengaged with the blade; and
   a second position of the indexing member when the indexing member is engaged with the blade; and
   wherein the indexing member is a pin.

10. The adjustable square of claim 1, further comprising a plurality of indexing apertures that are evenly spaced along a length of the blade.

11. The adjustable square of claim 10, wherein the indexing member passes over at least a portion of one of the plurality of indexing apertures; and wherein the indexing member operably engages the blade.

12. The adjustable square of claim 1, further comprising:
   a spring operative to move the indexing member along an axis.

13. The adjustable square of claim 12, wherein the spring is operative to move the indexing member into engagement with the blade when depressed.

14. The adjustable square of claim 1, wherein the body comprises:
   a front region;
   a rear region;
   a first side region at a right angle to the front region and rear region; and
   a second side region at an acute angle with respect to front region and an obtuse angle with respect to the rear region.

15. The adjustable square of claim 1, further comprising:
   a sliding tab operably engaged with the body, wherein the sliding tab is adapted to be moveable relative to the body.

16. The adjustable square of claim 15, wherein the sliding tab further comprises:
   a sliding tab body;
   a locking pin; and
   a restrictor;
   wherein the sliding tab is operative to move within a channel within the body and the sliding tab body is adapted to support the adjustable square when retained on a workpiece.

17. A method for indexing an adjustable square comprising:
   positioning a body of the adjustable square at a first position along a scale of a blade of the adjustable square;
   aligning one of a plurality of discrete indexing apertures formed in the blade with an indexed bore formed in the body;
   operably engaging a portion of the blade with a portion of an indexing member to fix the body at the first position inside of one of the plurality of discrete indexing apertures formed in the blade independently of a locking mechanism;
   indexing with the indexing member of the adjustable square at the first position; and
   operably engaging the locking mechanism with a portion of the blade to lock the body at a second position orthogonal to the first position of the indexing member.

18. The method of claim 17, further comprising:
   wherein positioning further includes:
   disengaging the locking mechanism from a locked position to an unlocked position;
   disconnecting a clamping member from the blade; and
   moving the body with respect to the blade or the blade with respect to the body.

19. The method of claim 18, further comprising:
   reengaging the locking mechanism to a locked position from an unlocked position; and
   preventing movement of the body with respect to the blade or the blade with respect to the body.

20. The method of claim 17, further comprising:
   depressing the indexing member in an axial manner to engage with a single aperture of the blade.

21. The method of claim 20, further comprising:
   overcoming a spring biasing force applied by a spring located in the indexed bore and in operative contact with the indexing member in order to depress the indexing member in an axial manner.

* * * * *